United States Patent
Minowa et al.

(10) Patent No.: US 7,187,667 B1
(45) Date of Patent: Mar. 6, 2007

(54) RECEIVING DEVICE FOR USE IN CDMA COMMUNICATIONS

(75) Inventors: Morihiko Minowa, Kanagawa (JP); Tokuro Kubo, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/322,444

(22) Filed: May 28, 1999

(30) Foreign Application Priority Data

Nov. 16, 1998 (JP) .................................. 10-325176

(51) Int. Cl.
 *H04B 7/216* (2006.01)
(52) U.S. Cl. ..................... 370/335; 370/342; 370/347; 375/152
(58) Field of Classification Search ................ 370/335, 370/337, 441, 516, 342, 479, 320, 328, 465, 370/468; 375/130, 143, 147, 316, 343, 349, 375/324, 340; 708/314
See application file for complete search history.

(56) References Cited

U.S. PATENT DOCUMENTS

| | | | | |
|---|---|---|---|---|
| 5,910,948 A * | 6/1999 | Shou et al. | ................. | 370/335 |
| 6,026,115 A * | 2/2000 | Higashi et al. | ............. | 375/200 |
| 6,052,405 A * | 4/2000 | Nakano | ...................... | 375/200 |
| 6,233,272 B1 * | 5/2001 | Yugawa | ...................... | 375/148 |
| 6,307,850 B1 * | 10/2001 | Watanabe | ................... | 370/335 |
| 6,377,613 B1 * | 4/2002 | Kawabe et al. | ............. | 375/142 |
| 6,381,233 B1 * | 4/2002 | Sunaga | ....................... | 370/335 |
| 2003/0003914 A1 * | 1/2003 | Kubo et al. | ................. | 455/441 |

\* cited by examiner

*Primary Examiner*—Duc Ho
(74) *Attorney, Agent, or Firm*—Katten Muchin Rosenman LLP

(57) ABSTRACT

An input signal includes spread signals which are respectively transmitted over a plurality of channels. First and second despread demodulators demodulate the spread signals transmitted over first and second communications channels by despreading them with first and second spread codes, respectively. A path detector generates a timing signal for instructing the timing at which the despread demodulators perform the despread operation. The path detector is shared by the first and the second despread demodulators, and operates in a time-division manner.

20 Claims, 25 Drawing Sheets

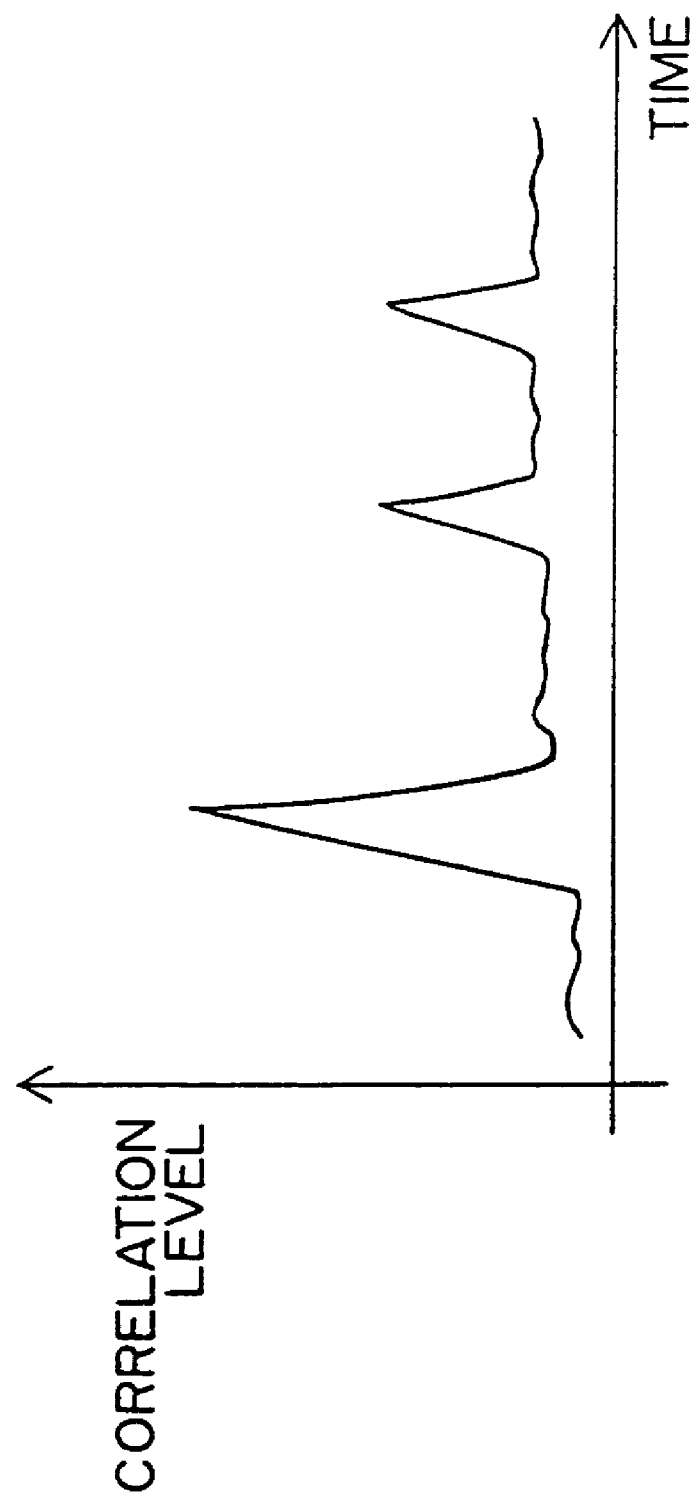

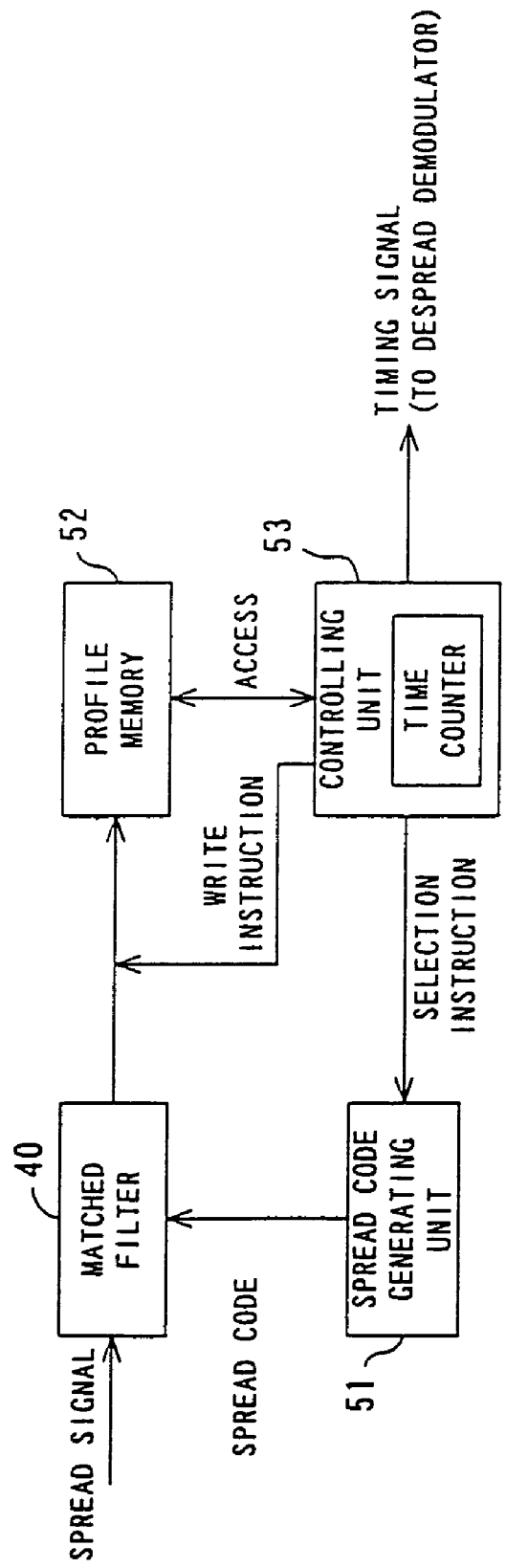
F I G. 6

| ADDRESS (CORRESPONDING TO VALUE OF TIME COUNTER) | CORRELATION LEVEL DATA |
|---|---|
| 0 0 0 0 0 0 0 1 | 1 3 |
| 0 0 0 0 0 0 1 0 | 1 9 |
| 0 0 0 0 0 0 1 1 | 2 7 |
| 0 0 0 0 0 1 0 0 | 4 5 |
| ⋮ | ⋮ |
| 0 1 0 0 0 0 0 1 | 4 |
| 0 1 0 0 0 0 1 0 | 4 |
| ⋮ | ⋮ |

FIG. 7

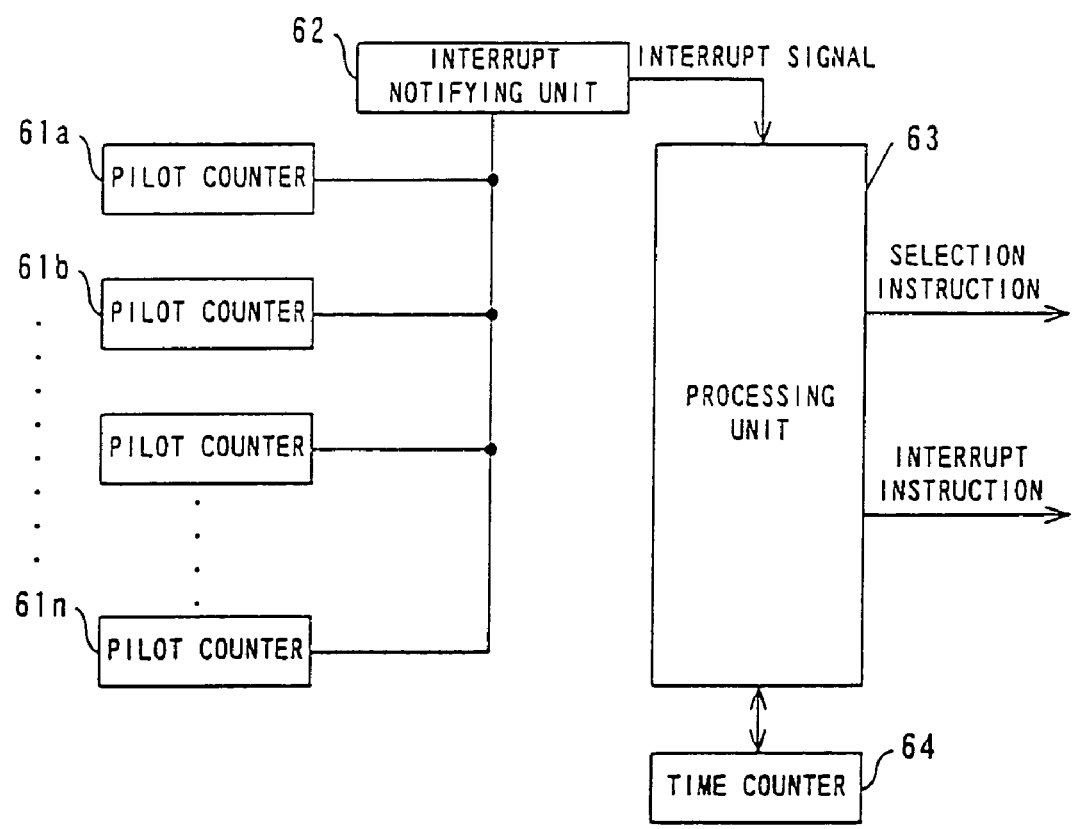
F I G. 9

| COMMUNICATION CHANNEL | PRIORITY LEVEL |
|---|---|
| #a | 4 |
| #b | 3 |
| #c | 3 |
| ⋮ | ⋮ |
| #n | 2 |

FIG. 12

DELAY PROFILE
CHARACTERISTIC
AT TIME T1

DELAY PROFILE
CHARACTERISTIC
AT TIME T2

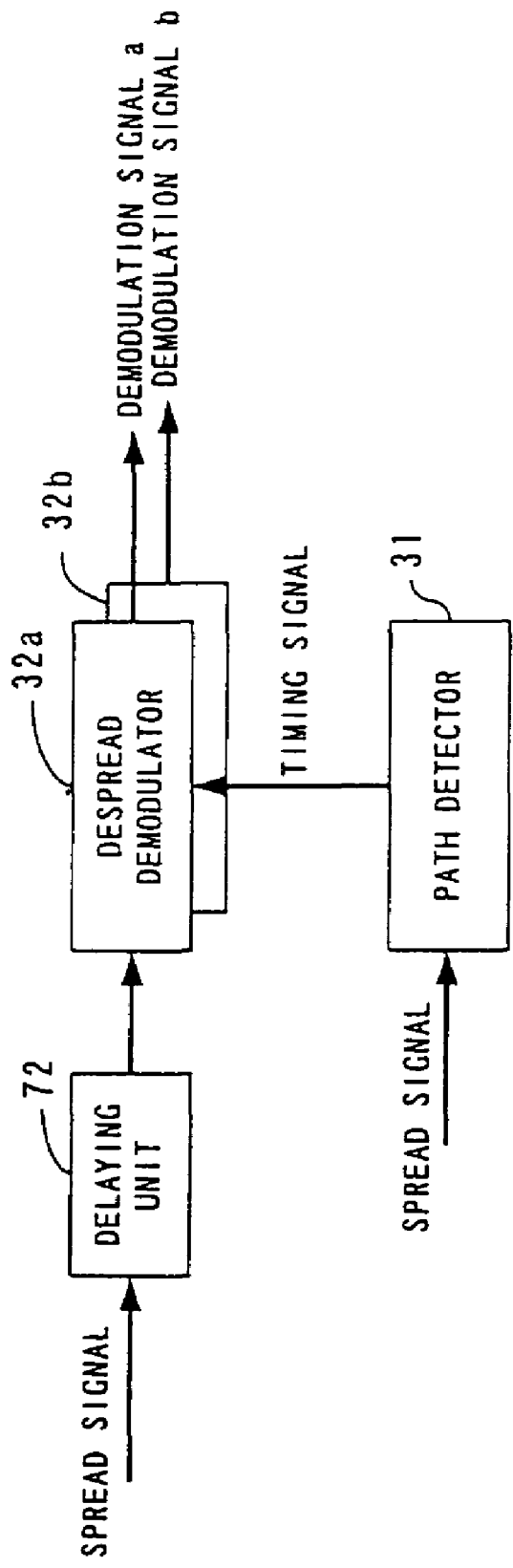
F I G. 18

RECEIVING DEVICE FOR USE IN CDMA COMMUNICATIONS

BACKGROUND OF THE INVENTION

1. Field of the Invention

The present invention relates to a receiving device for use in a CDMA communications system.

2. Description of the Related Art

Mobile communications have become popular in recent years. As communication methods, methods such as FDMA (Frequency Division Multiple Access), TDMA (Time Division Multiple Access), CDMA (Code Division Multiple Access), etc. are used. Among these methods, CDMA draws public attention as one of standard communication methods of the next generation.

CDMA is a communication method utilizing a spread spectrum technique. Accordingly, with CDMA, a plurality of users simultaneously share the same frequency by using spread codes unique to the respective users. As the spread codes, for example, a PN (Pseudo Noise) sequence or a Gold code is used. The bandwidth of a spread code is much wider than that of data to be transmitted.

A transmitting device multiplies data to be transmitted by a spread code, and outputs the result of the multiplication. As a result, the frequency bandwidth of a transmission signal is broadened. That is, a spectrum is spread. A receiving device regenerates data by multiplying a reception signal by the same spread code as that used by the transmitting device. If the receiving device multiplies the reception signal by a spread code different from that used by the transmitting device, the receiving device cannot properly regenerate data.

CDMA has the following features: the number of user channels per unit bandwidth can be increased because a plurality of users simultaneously share the same frequency bandwidth; a transmission signal is unsusceptible to fading because the frequency bandwidth of the transmission signal is broadened; and secrecy (confidentiality) of conversation is maintained because data is not properly regenerated if a transmitting device and a receiving device do not use the same spread code.

FIG. 1 is a block diagram showing the configuration of a conventional receiving device. A receiving device 500 generates a demodulation signal by multiplying a received spread signal by a spread code. Normally, however, a plurality of paths having different communications channel lengths exist between transmitting and receiving devices. Therefore, the spread signal input to a receiving device fundamentally includes a plurality of signals transmitted over different paths. The above described state where a plurality of paths exist is sometimes referred to as a multipath environment.

A path detector 501 identifies the signals transmitted over respective paths under a multipath environment. To be more specific, the path detector 501 comprises a matched filter, and obtains a delay profile of a spread signal by continuously detecting the correlation between a received spread signal and a spread code. The delay profile is data representing an amount of a delay (or a phase delay) of each of signals transmitted over different paths. The path detector 501 generates a timing signal based on this delay profile. A despread demodulator 502 generates a demodulation signal by multiplying a received spread signal by a spread code according to the timing signal.

In mobile communications, the delay profile of a communications channel continuously varies as a mobile terminal moves or the environment of a transmission line changes. In this case, the despread demodulator 502 must adjust the timing at which a spread signal is multiplied by a spread code, depending on a change of the delay profile. Accordingly, the path detector 501 periodically monitors the delay profile of a communications channel, generates a timing signal based on the result of the monitoring, and provides the despread demodulator 502 with the generated timing signal. Then, the despread demodulator 502 continues to demodulate a spread signal while adjusting the multiplication timing according to the timing signal.

In recent years, a receiving device for simultaneously receiving signals transmitted over a plurality of different communications channels in a CDMA communications system has been studied. Up to date, however, a specific proposal for realizing this capability has not been made.

To realize this capability, a plurality of receiving devices each composed of the path detector 501 and the despread demodulator 502, which are shown in FIG. 1, may be arranged. Namely, the arrangement of a plurality of sets of a path detector and a despread demodulator allows this capability to be realized. In this case, each path detector detects a delay profile for each communications channel, while a corresponding despread demodulator demodulates a spread signal according to each detected delay profile.

As is well-known to a person having the ordinary skill in the art, however, the circuitry size of a matched filter arranged within a path detector is very large and consumes much power. Therefore, if a plurality of path detectors are arranged within a receiving device, the circuitry size of the receiving device becomes larger and consumes much more power. That is, this problem is an obstacle to the demand for reducing the receiving device in size.

SUMMARY OF THE INVENTION

An object of the present invention is to provide a device for simultaneously receiving spread signals transmitted over a plurality of channels in a CDMA communications system, and to reduce the size and the power consumption of the device.

A receiving device according to the present invention assumes the configuration where spread signals transmitted over a plurality of channels in a CDMA communication are received, and comprises a path detector and a plurality of despread demodulators. The path detector is used to generate timing signals for the plurality of channels in a time-division manner. That is, the path detector generates a timing signal corresponding to each channel according to the correlation between an input signal including the spread signals transmitted over the plurality of channels and a spread code corresponding to each of the channels. Additionally, the plurality of despread demodulators are arranged for the plurality of channels, and demodulate a corresponding spread signal among the plurality of spread signals included in the input signal according to the timing signal generated by the path detector.

In the above described configuration, the path detector operates for a certain channel in a certain time period, and operates for a different channel in a different time period. That is, the path detector is allocated to a plurality of channels in a time-division manner, and generates a timing signal for the plurality of channels. Accordingly, the receiving device according to the present invention can receive a plurality of spread signals which are simultaneously transmitted over a plurality of channels, by using a single path detector, thereby reducing the size and the power consumption of the receiving device.

In addition to the above described configuration, the receiving device according to the present invention may further comprise priority information storing means for storing the information about the priorities of the plurality of despread demodulators, and the path detector may operate for the despread demodulator determined based on the priority information stored in the priority information storing means.

With such a configuration, timing is adjusted for a desired channel with higher priority by setting the priority information, so that the communications quality of a plurality of channels remains high.

BRIEF DESCRIPTION OF THE DRAWINGS

FIG. 4B exemplifies the output of the matched filter;

FIG. 6 is a block diagram showing the configuration of the path detector;

FIG. 7 schematically exemplifies the structure of a profile memory;

FIG. 9 shows the configuration of a controlling unit for implementing the operations shown in FIG. 8;

FIG. 12 exemplifies a priority table;

FIG. 18 is a block diagram showing the configuration of a CDMA receiving device in which a delay unit for storing an input signal is arranged at a stage preceding a despread demodulator;

DETAILED DESCRIPTION OF THE INVENTION

Figure 1:
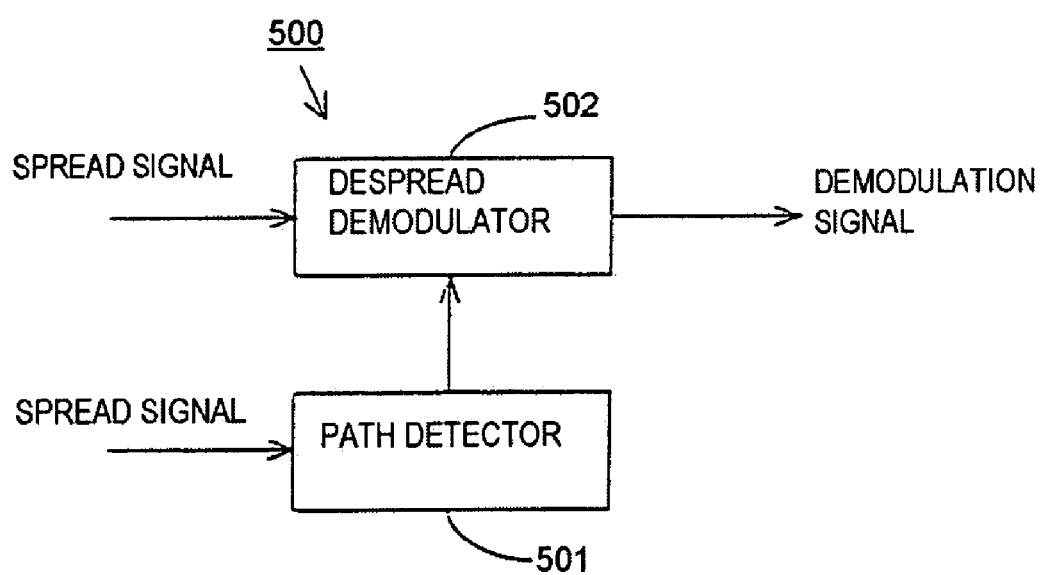
FIG. 1 is a block diagram showing the configuration of a conventional receiving device.
Figure 2:
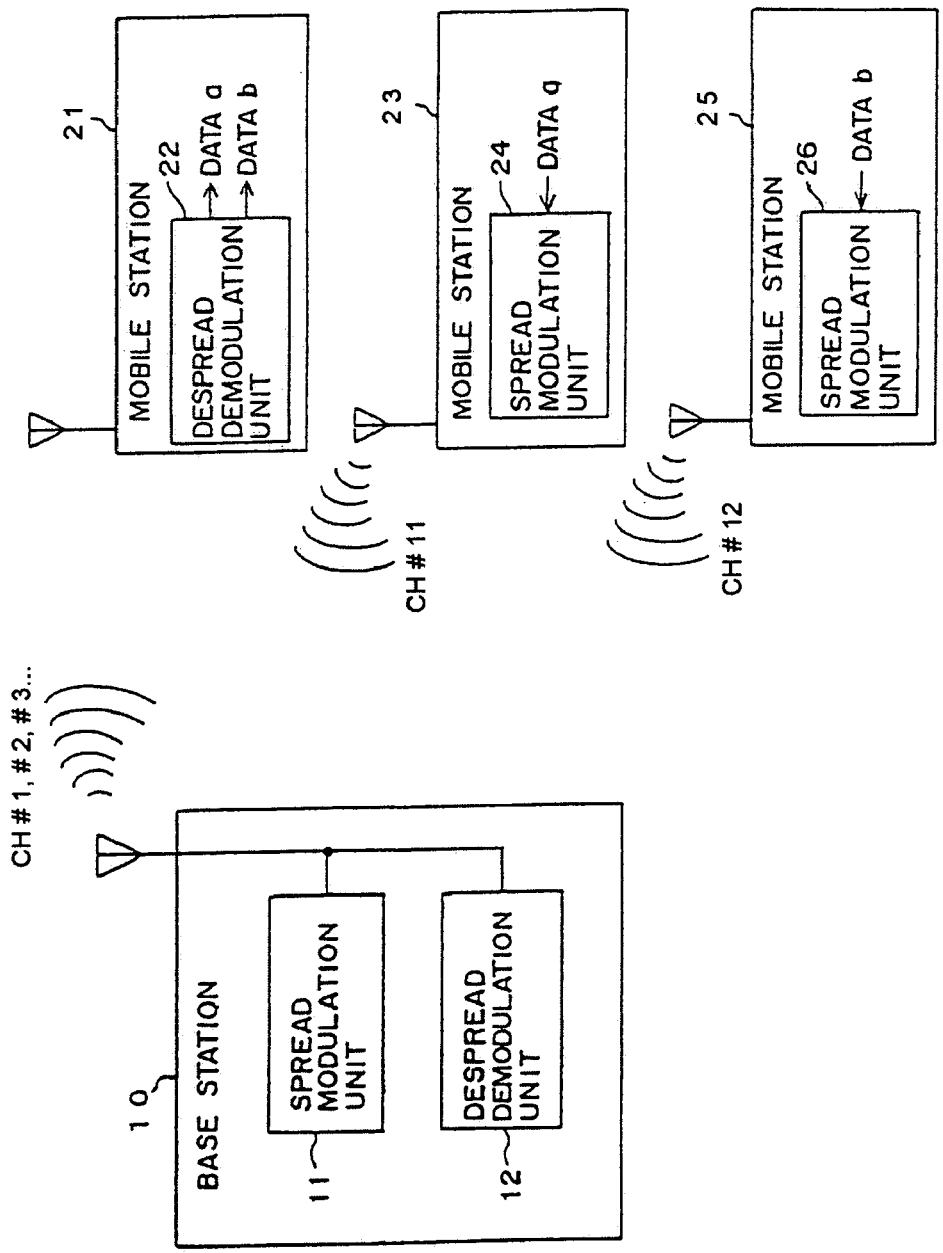
FIG. 2 shows the configuration of a CDMA communications system where a CDMA receiving device according to a preferred embodiment of the present invention is used.

FIG. 2 shows the configuration of a CDMA communications system where a CDMA receiving device according to a preferred embodiment of the present invention is used. A base station 10 transmits/receives a radio signal to/from mobile stations (mobile terminals) 21, 23, and 25 over communications channels. Each of the base station 10 and the mobile stations 21, 23, and 25 comprises a spread modulation unit and a despread demodulation unit. The spread modulation unit spreads the spectrum of a signal to be transmitted by multiplying the signal by a spread code. The despread demodulation unit demodulates a reception signal by multiplying the signal by the spread code. Actually, the mobile station 21 comprises a spread modulation unit and the mobile stations 23 and 25 respectively comprise the despread demodulation unit although they are omitted for ease of reference to the drawing.

Signals are transmitted over different communications channels between the base station 10 and the respective mobile stations 21, 23, and 25. The base station 10 and the mobile stations 21, 23, and 25 can respectively receive the signals transmitted over the plurality of communications channels. Here, the operations performed when data a is transmitted from the mobile station 23 to the mobile station 21 via the base station 10, and data b is concurrently transmitted from the mobile station 25 to the mobile station 21 via the base station 10 are explained as one example. Assume that a communications channel CH#11 is set in order to transmit a signal from the mobile station 23 to the base station 10, and a communications channel CH#12 is set in order to transmit a signal from the mobile station 25 to the base station 10. Also assume that two communications channels CH#1 and CH#2 are set in order to transmit a signal from the base station 10 to the mobile station 21. These communications channels are set by the base station 10 or an exchange which is not shown and is connected to the base station 10.

The mobile station 23 spreads the data a by using the spread code #11 corresponding to the communications channel CH#11, and outputs the spread signal. Similarly, the mobile station 25 spreads the data b by using the spread code #12 corresponding to the communications channel CH#12, and outputs the spread signal. These spread processes are respectively performed by spread modulation units 24 and 26.

The base station 10 receives spread signals from many mobile stations. The despread demodulation unit 12 spreads reception signals by respectively using the spread codes #11 and #12 in order to demodulate the spread signals transmitted over the communications channels CH#11 and CH#12. In this way, the data a and b are regenerated.

When the base station 10 identifies that the destinations of the data a and b are the mobile station 21, it spreads the respective data a and b by using the spread codes #1 and #2 corresponding to the communications channels CH#1 and CH#2, and outputs the spread signals. This spread process is performed by the spread modulation unit 11.

When each mobile station receives a spread signal from the base station 10, its despread demodulation unit despreads the reception signal by using the spread code corresponding to the communications channel set for receiving the signal from the base station 10. That is, the despread demodulation unit 22 of the mobile station 21 respectively multiplies the reception signals by the spread codes #1 and #2 in order to demodulate the spread signals transmitted over the communications channels CH#1 and CH#2. As a result, the data a and b are regenerated.

With the CDMA communications system according to the preferred embodiment of the present invention, spread codes which are different for respective communications channels are used as described above. Accordingly, the despread demodulation unit can demodulate spread signals corresponding to one or a plurality of predetermined spread signals among reception signals including many spread signals, by using the one or the plurality of predetermined spread codes.

In the example shown in FIG. 2, the present invention principally relates to the despread demodulation unit 11 for demodulating a plurality of spread signals within the base station 10, or to the despread demodulation unit 22 for demodulating a plurality of spread signals within the mobile station 21.

Figure 3:
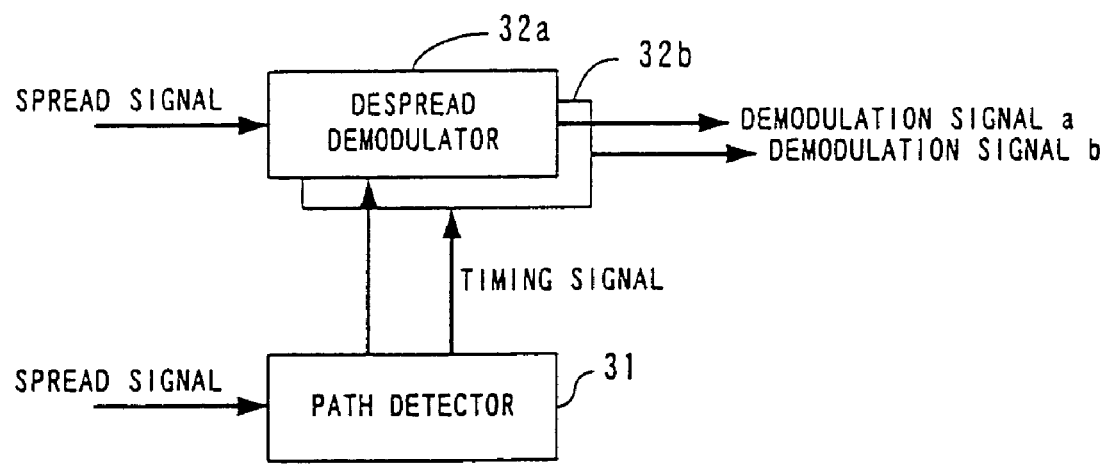
FIG. 3 shows the fundamental configuration of a CDMA receiving device according to the present invention.

FIG. 3 shows the fundamental configuration of a CDMA receiving device according to a preferred embodiment of the present invention. This CDMA receiving device includes N path detectors and M despread demodulators. Here, both N and M are natural numbers, and N<M. In this preferred embodiment, N=1 and M=2. Accordingly, each path detector operates for a plurality of despread demodulators. Namely, each path detector is shared by the plurality of despread demodulators in a time-division manner.

The CDMA receiving device according to this preferred embodiment comprises a plurality of despread demodulators 32$a$ and 32$b$ in order to demodulate spread signals transmitted over a plurality of communications channels. Each despread demodulator demodulates a spread signal transmitted over a single communications channel. For example, the despread demodulators 32$a$ and 32$b$ respectively demodulate the spread signals transmitted over the communications channels #a and #b. At this time, the despread demodulator 32$a$ uses the spread code #a corresponding to the communications channel #a, while the despread demodulator 32$b$ uses the spread code #b corresponding to the communications channel #b.

It is vital to adjust the timing at which an input spread signal is multiplied by a spread code for each communications channel. Even if a spread signal transmitted over a certain communications channel is multiplied by the spread code corresponding to that communications channel, the spread signal is not demodulated when the multiplication timing is not good. Therefore, the CDMA receiving device has a capability for detecting the timing at which a spread code is to be multiplied for each communications channel. In the CDMA receiving device according to this preferred embodiment, a path detector 31 offers this capability.

In mobile communications, the delay profile of a communications channel continuously varies, for example, as a mobile terminal moves or the environment of a transmission line changes. In this case, the despread demodulators 32$a$ and 32$b$ need to adjust the timing at which a spread signal is multiplied by a spread code depending on a change of the delay profile. Accordingly, the path detector 31 periodically monitors the delay profile of a communications channels, generates timing signals based on the result of the monitoring, and provides the despread demodulators 32$a$ and 32$b$ with the generated signals. Then, the despread demodulators 32$a$ and 32$b$ continue to demodulate spread signals while adjusting the multiplication timing according to the timing signals.

The path detector 31 detects a path for each communications channel, for example, by using a matched filter. Here, the "path" means a plurality of paths having different channel lengths and exist between a transmitting and a receiving device, and can be obtained by detecting a delay profile.

Figure 4A:
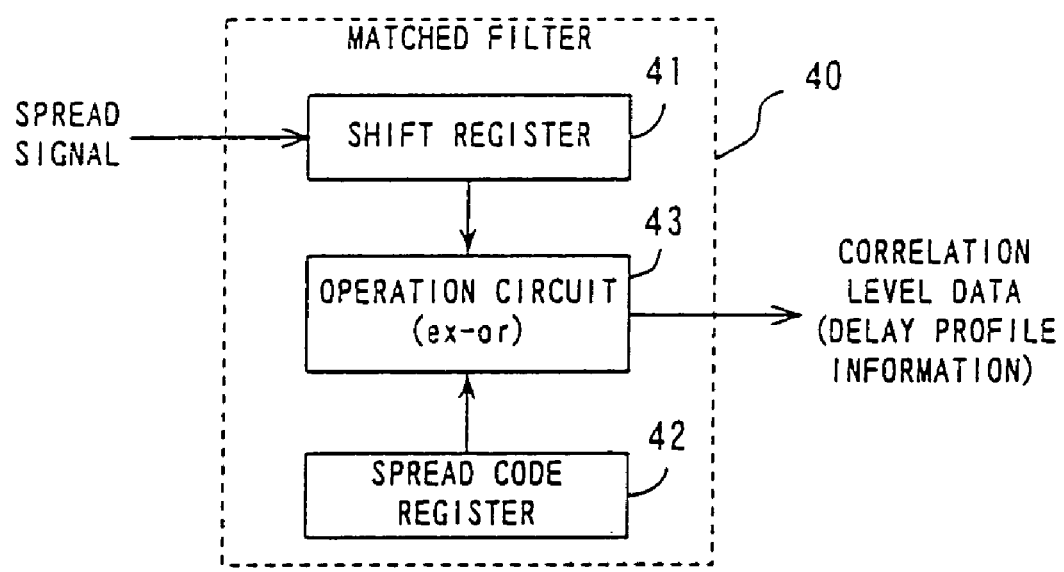
FIG. 4A shows the fundamental configuration of a typical matched filter included by a path detector.

FIG. 4A shows the fundamental configuration of a typical matched filter included by a path detector. A matched filter 40 comprises, for example, a shift register 41 for sequentially storing an arrived spread signal, a spread code register 42 for storing a spread code, and an operation circuit 43 for performing an operation (such as an exclusive-OR operation) for obtaining the correlation between the spread signal stored by the shift register 41 and the spread code stored by the spread code register 42, and continually outputs the data representing the level of the correlation between an input spread signal and the spread code. FIG. 4B exemplifies the correlation level data (delay profile information) output from the matched filter 40.

The path detector 31 generates a timing signal for instructing the timing at which a received spread signal is to be multiplied by a spread code within a despread demodulator, based on the delay profile information. By way of example, the timing signal is generated at the timing at which the correlation level becomes the maximum, or at the timing at which the correlation level exceeds a predetermined threshold value. Then, the path detector 31 provides a corresponding despread demodulator with the generated timing signal.

In the CDMA receiving device according to this preferred embodiment, the path detector 31 provides a plurality of despread demodulators with timing signals. That is, the path detector 31 is shared by the plurality of despread demodulators.

Figure 5A:
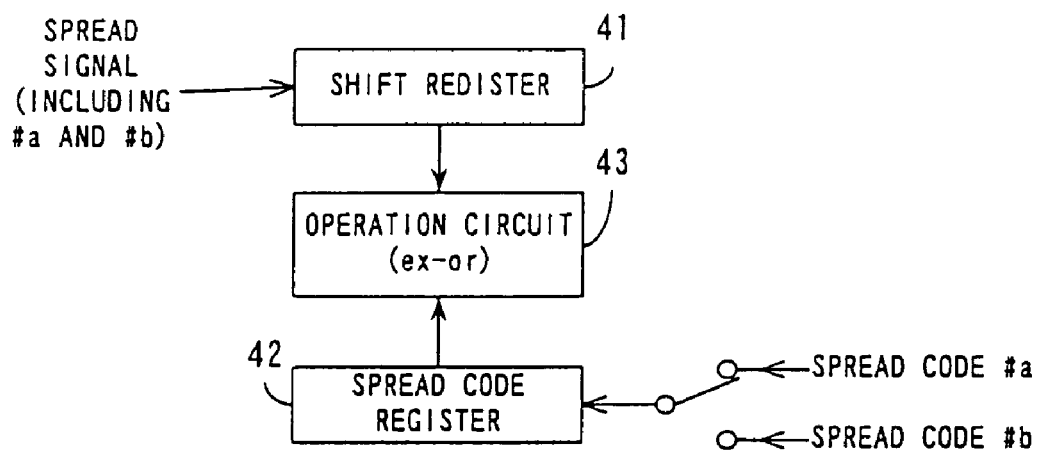
FIG. 5A is a block diagram showing the principal part of a path detector according to a preferred embodiment.

FIG. 5A is a block diagram showing the principal part of the path detector according to this preferred embodiment. Here, assume that the CDMA receiving device demodulates the spread signals transmitted over the communications channels CH#a and CH#b. Note that a shift register 41, a spread code register 42, and an operation circuit 43 are the same as those explained by referring to FIG. 4A.

Either spread code #a or #b is written to the spread code register 42. The operation circuit 43 sequentially outputs the data representing the level of the correlation between a signal which is sequentially input to the shift register 41 and a spread code written to the spread code register 42. Accordingly, the data output from the operation circuit 43 is the delay profile information about the communications channel CH#a while the spread code #a is stored in the spread code register 42, and is the delay profile information about the communications channel CH#b while the spread code #b is stored in the spread code register 42.

Figure 5B:
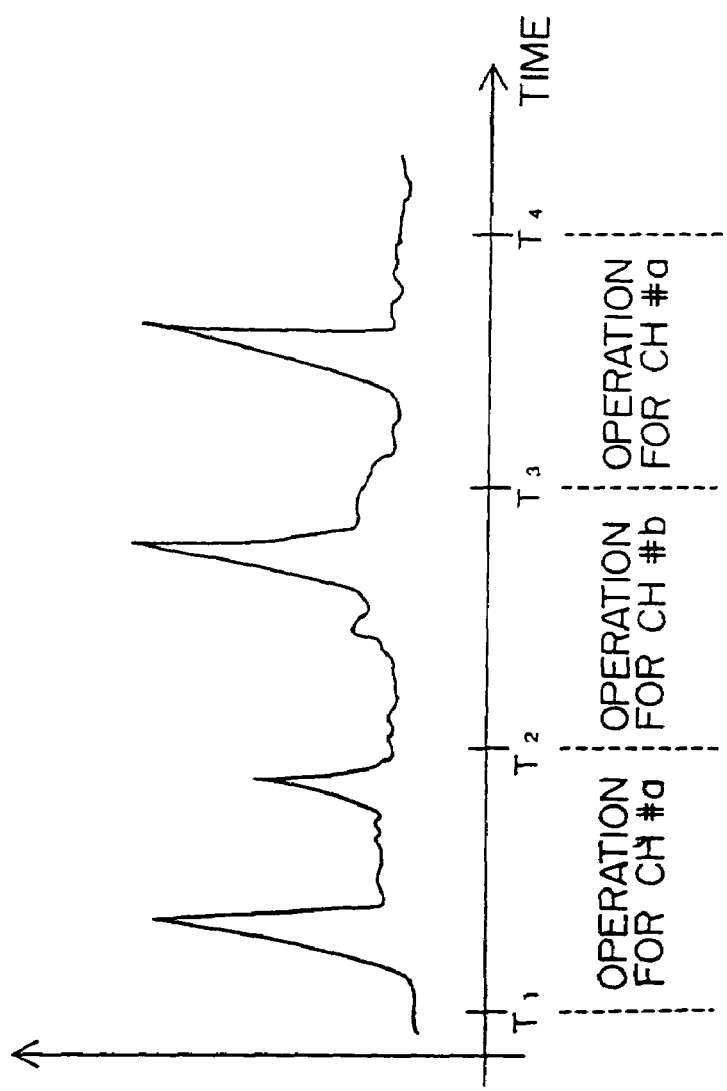
FIG. 5B shows an output of an operation circuit.

FIG. 5B shows the output of the operation circuit 43 shown in FIG. 5A. Here, the spread code #a is stored in the spread code register 42 between times T1 and T2 and between times T3 and T4, while the spread code #b is stored in the spread code register 42 between times T2 and T3. Accordingly, the path detector 31 operates for the communications channel CH#a in a period from time T1 to time T2 and a period from time T3 to time T4, and generates a timing signal based on the correlation level data obtained during these time periods. The generated timing signal is provided to the despread demodulator 32$a$. Similarly, the path detector 31 operates for the communications channel CH#b in a period from time T2 to time T3, and provides the despread demodulator 32b with the timing signal that the path detector 31 itself generates based on the correlation level data obtained during this time period. The despread demodulators 32a and 32b respectively demodulate a signal by spreading a reception signal according to the timing signal provided from the path detector 31.

FIG. 6 is a block diagram showing the configuration of the path detector 31. A matched filter 40 has the capability explained by referring to FIGS. 4A and 4B. A spread code generating unit 51 generates a spread code according to a selection instruction issued from a controlling unit 53, and provides the matched filter 40 with the generated code. The spread code generating unit 51 comprises, for example, a Gold code generating circuit. In this case, the selection instruction issued from the controlling unit 53 is a signal for instructing the phase (the amount of delay) of the data sequence input to one of shift registers of the Gold code generating circuit. A profile memory 52 stores the output of the matched filter 40. The output of the matched filter 40 is the correlation level data (delay profile information), which is written to the address determined according to the write instruction issued from the controlling unit 53.

The controlling unit 53 generates the above described selection and write instructions, and generates a timing signal based on the correlation level data stored in the profile memory 52. The controlling unit 53 comprises a counter that is incremented with time or a counter representing a current time, and generates the above described selection and write instructions according to the value of the counter. This counter is hereinafter referred to as a "time counter".

Assuming that the value of the time counter is incremented up to the value representing the time T1 shown in FIG. 5B, the controlling unit 53 issues the selection instruction for generating the spread code #a to the spread code generating unit 51. Additionally, the controlling unit 53 generates the write instruction for writing the output of the matched filter 40 to the address corresponding to the value of the time counter. Consequently, the value of the correlation level data, which varies with time, is sequentially stored in the profile memory 52 as shown in FIG. 7.

The controlling unit 53 generates a timing signal for each communications channel. For example, when the spread code generating unit 51 generates the spread code #a in a time period during which the count value is between 000x and 000y, the matched filter 40 outputs the correlation level data for the communications channel #a during this time period. The correlation level data generated during that period are written to the addresses corresponding to the count values between 000x and 000y within the profile memory 52. Therefore, the controlling unit 53 extracts the correlation level data from the addresses corresponding to the count values between 000x and 000y, when generating the timing signal for the communications channel #a.

The timing signal is the value of the time counter, for example, when the correlation level data is a peak value. The count value in this case is the information representing an amount of time (a time). Accordingly, the timing signal in this case is a signal representing the timing at which the correlation between an input signal and a spread code hits a peak value on a certain communications channel.

If the path detector 31 has the above described configuration, each despread demodulator comprises a time counter equivalent to that comprised by the path detector 31. Each despread demodulator identifies the timing at which a reception signal must be multiplied by a spread code based on the timing signal provided from the path detector 31 and the value of the time counter within the local device itself.

As described above, the CDMA receiving device according to this preferred embodiment comprises a plurality of despread demodulators for respectively demodulating spread signals transmitted over a plurality of communications channels, and a path detector for generating timing signals for the plurality of despread demodulators. Therefore, the path detector including a matched filter of a large hardware size is shared, thereby reducing the size and the power consumption of the CDMA receiving device.

In this preferred embodiment, a transmission signal is composed of a data signal and a pilot signal inserted at predetermined time intervals. The pilot signal is obtained from a predetermined data sequence, and is used, by way of example, for establishing synchronization. A spread signal is obtained by multiplying the data signal by a spread code after the pilot signal is inserted in the data signal. For the path detection operations, it is more advantageous to use the pilot signal rather than the data signal.

Figure 8:
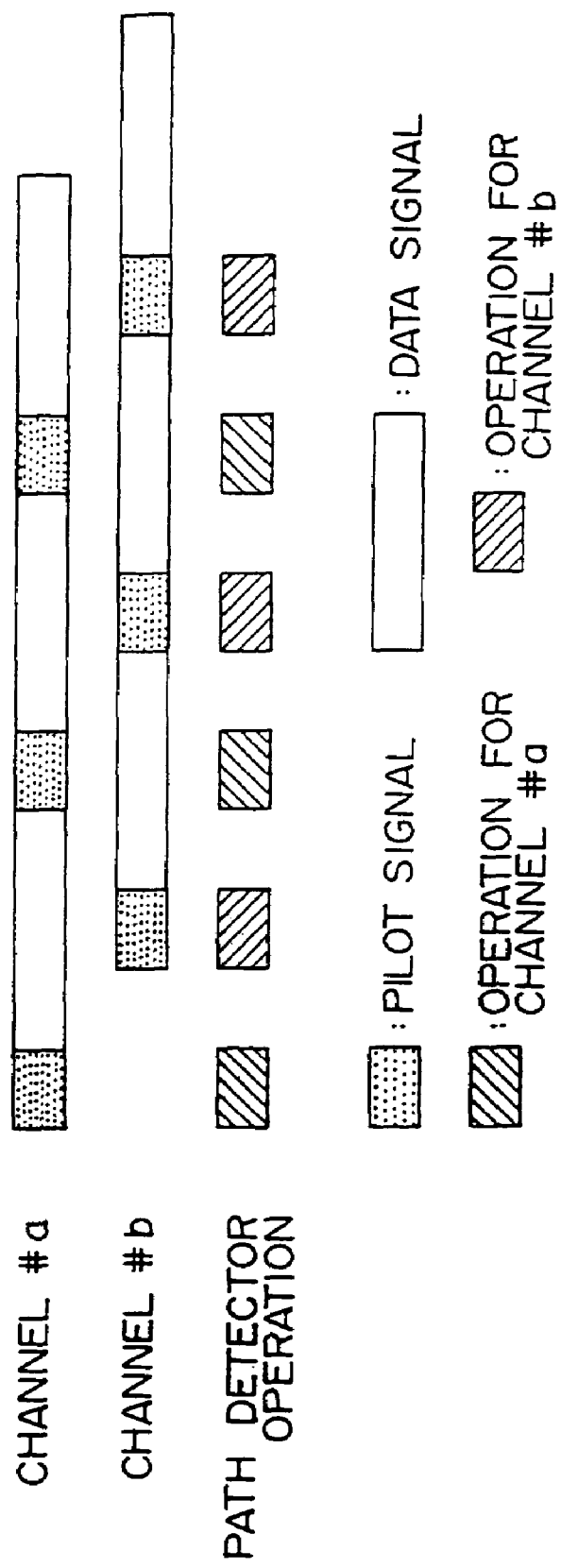
FIG. 8 schematically shows the method for generating timing signals by using pilot signals.

FIG. 8 is a schematic explaining a method for generating a timing signal by using a pilot signal. Here, a CDMA receiving device is assumed to have the capability for detecting a pilot signal. The method for detecting a pilot signal is a known technique.

Spread signals are independently and respectively transmitted for communications channels. Therefore, a plurality of spread signals received by the CDMA receiving device are mutually independent, and the timing at which pilot signals arrive are normally different for the respective communications channels.

Upon detection of a pilot signal within the spread signal received over the communications channel CH#a, the path detector 31 operates for the communications channel CH#a during the time period corresponding to the pilot signal. That is, the path detector 31 generates a timing signal based on the correlation level data between the pilot signal transmitted over the communications channel CH#a and the spread code #a, and provides the despread demodulator 32a with the generated timing signal. Similarly, upon detection of the pilot signal within the spread signal received over the communications channel CH#b, the path detector 31 operates for the communications channel CH#b during the time period corresponding to the pilot signal.

FIG. 9 is a block diagram showing the configuration of the controlling unit for implementing the operations shown in FIG. 8. Pilot counters 61a through 61n are arranged for respective communications channels, and output a pulse signal in the same cycle as the insertion cycle of a pilot signal. Each of the pilot counters 61a through 61n starts its count operation when a pilot signal is detected on a corresponding communications channel, and outputs a pulse signal every cycle described above. With this configuration, each of the pilot counters 61a through 61n outputs a pulse signal each time a pilot signal arrives on a corresponding communications channel.

An interrupt notifying unit 62 receives the pulse signal from each of the pilot counters 61a through 61n, and generates an interrupt signal according to the received pulse signal. For instance, upon receipt of the pulse signal from the pilot counter 61a, the interrupt notifying unit 62 notifies a processing unit 63 that a pilot signal is detected on the communications channel #a.

Upon receipt of the interrupt signal from the interrupt notifying unit 62, the processing unit 63 generates the above described selection and write instructions according to the received interrupt signal. For example, upon recognition that the pilot signal is detected on the communications channel CH#a, the processing unit 63 provides the spread code generating unit 51 with the selection instruction for generating the spread code #a, and generates the write instruction for instructing the address at which the output of the matched filter 40 is to be stored according to the value of the time counter 64. The time counter 64 is, for example, a counter representing a current time.

Note that the process for generating correlation level data based on the selection and write instructions, and the process for generating a timing signal based on the correlation level data are the same as those described above.

In the above described configuration, pilot signals each of which includes a plurality of symbols may be used. Here, a symbol corresponds to a single signal point when a signal is transmitted. For example, if a signal is modulated with QPSK, 2-bit data is assigned to one signal point. Therefore, each symbol corresponds to 2-bit data.

Figure 10:
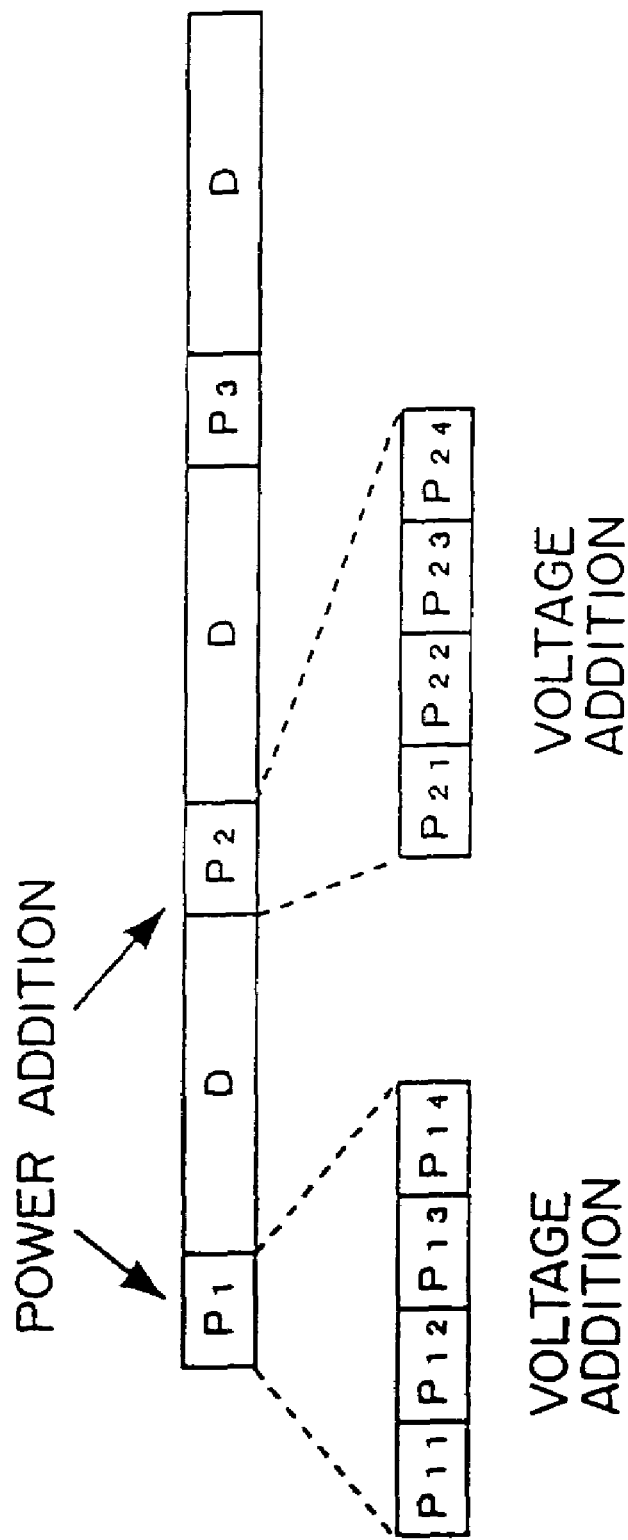
FIG. 10 is a schematic diagram for explaining the operations of the path detector when a pilot signal including a plurality of symbols is used.

FIG. 10 is a schematic explaining the operations of the path detector when pilot signals each of which includes a plurality of symbols are used. This figure shows the case where each pilot signal is composed of 4 symbols.

Since the phase lags between respective symbols included in one pilot signal are small in an I-Q space, the correlation of this pilot signal is high. Accordingly, a voltage addition (or an amplitude addition) is made to the output of the matched filter 40 in this case. As is well-known, a large gain can be obtained with the voltage addition rather than with a power addition. For instance, the addition $P1=P11+P12+P13+P14$ is made in the example shown in FIG. 10. In the meantime, a phase lag between one pilot signal and another may sometimes become large in the I-Q space. Therefore, the correlation level of the pilot signal becomes low. Accordingly, the power addition is made to the output of the matched filter 40 in this case. Since amplitude data are squared in the power addition, an added value is never cancelled even if the phase is inverted. By way of example, the following addition is made in the example shown in FIG. 10.

$$P=P1^2+P2^2+P3^2+\ldots+Pn^2$$

Figure 11:
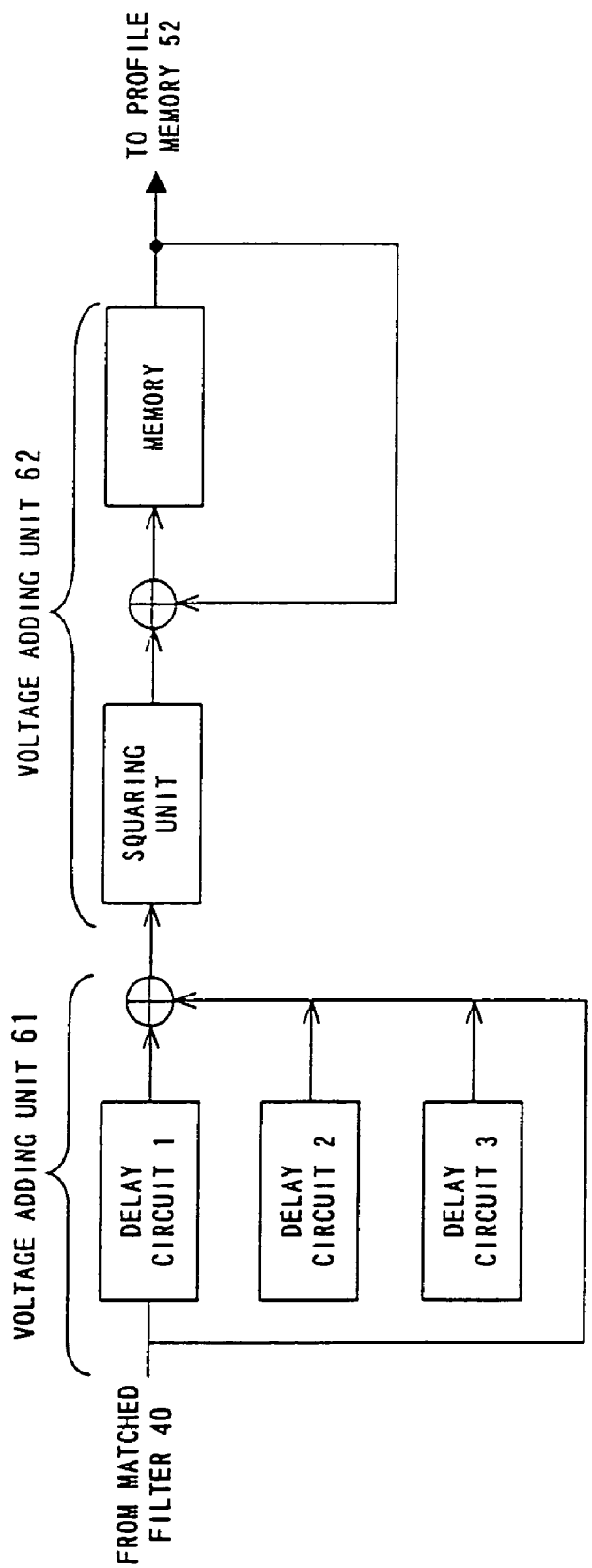
FIG. 11 shows the circuitry for performing addition operations shown in FIG. 10.
Figure 13:
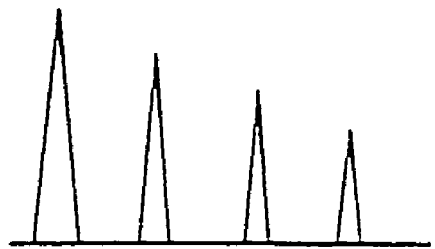
FIG. 13 exemplifies delay profiles changing with time.
Figure 13:
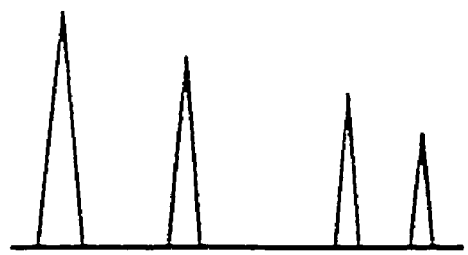

FIG. 11 shows the circuitry for performing the addition operation shown in FIG. 10. A voltage (amplitude) adding unit 61 has delay circuits for adjusting addition timing, and adds the data obtained for 4 symbols included in each pilot signal. A power adding unit 62 comprises a squaring unit for squaring the output of the voltage adding unit 61 and an adding circuit for accumulatively adding the output of the squaring unit. The output of the power adding unit 62 is written to a profile memory 52.

As described above, the path detector 31 within the CDMA receiving device according to this preferred embodiment performs both the amplitude addition and the power addition in order to obtain the correlation level data used for generating a timing signal, when a signal including a plurality of symbols is used as a pilot signal which is inserted in a data signal. Therefore, an accurate delay profile can be obtained while securing a large gain.

In the above described preferred embodiment, the power addition is made when the correlation level between pilot signals is low. However, an absolute value addition may be made instead of the power addition. In this case, an absolute value calculating unit may be arranged instead of the squaring unit. If the squaring unit is replaced with the absolute value calculating unit, the circuitry size can be reduced.

Because a plurality of spread signals received by the CDMA receiving device are mutually independent as described above, a plurality of pilot signals may simultaneously arrive at the receiving device via a plurality of communications channels in some cases. Notice that this simultaneousness includes the overlapping of parts of pilot signals on different channels. Next, the operations performed when pilot signals simultaneously reach via a plurality of communications channels are explained.

When pilot signals arrive via a plurality of communications channels, a plurality of pilot counters shown in FIG. 9 simultaneously output pulse signals. In this case, the processing unit 63 determines a communications channel for which a timing signal is to be generated by referencing the priority table shown in FIG. 12. Priority levels are set for respective communications channels.

Assuming that pilot signals are simultaneously detected on the communications channels CH#a and CH#b, the pilot counters 61a and 61b simultaneously output pulse signals. When a conflict occurs as described above, the processing unit 63 examines the priority levels of the communications channels CH#a and CH#b by referencing the priority table. In the example shown in FIG. 12, the highest priority is given to the communications channel #a. Accordingly, the path detector 31 generates a timing signal for the communications channel #a.

When the above described conflict occurs, the priority table is updated. By way of example, if the communications channel #a is selected when a conflict occurs between the communications channels #a and #b like in the above described example, the priority level of the communications channel #a is lowered (priority level is lowered from 4 to 3), and at the same time, the priority level of the communications channel #b is raised (the priority level is raised from 3 to 4). If the priority table is updated in this way, the communications channel #b is selected when a next conflict occurs between the communications channels #a and #b. With the above described process, timing signals are equally generated for the respective communications channels.

Remember that the priority table is referenced only when pilot signals simultaneously reach via a plurality of communications channels. This table is not referenced in other cases.

The method for updating the priority table is not limited to the above described method according to this preferred embodiment. Other possible methods are described below.

(1) Method for Giving the Highest Priority to a Newly Established Communications Channel When a communications channel is newly established, spread synchronization must be established. Therefore, a timing signal must be immediately provided to this communications channel. Namely, it is necessary to provide a timing signal to this communications channel with a priority higher than those of any other channels. Accordingly, the path detector 31 sets the highest value as the priority level of a communications channel in the priority table, upon detection of the request to establish the communications channel. Furthermore, when a mobile terminal moves from one cell to another (hand-over), the highest priority level is given to this communications channel in a similar manner.

With the above described method, timing information is provided to a communications channel for which path information is not obtained with a priority higher than those of any other channels. Accordingly, a timing signal is immediately provided to a newly established communications channel although the path detector 31 is shared by a plurality of communications channels in this preferred embodiment. Consequently, a high communication quality can be obtained in a short period of time.

(2) Method for Monitoring a Delay Profile

Demodulation timing of a spread signal is determined based on a delay profile. However, the delay profile of each communications channel continually changes due to the influence of the state of a transmission line or of the move of a terminal. Therefore, it is desirable to adjust the demodulation timing of a communications channel when the delay profile of the communications channels changes.

According to this preferred embodiment, a delay profile is continually monitored for each communications channel, and the priority level of a communications channel which significantly changes is raised. The priority level is set in the priority table in a similar manner as in the above described example.

Figure 14A:
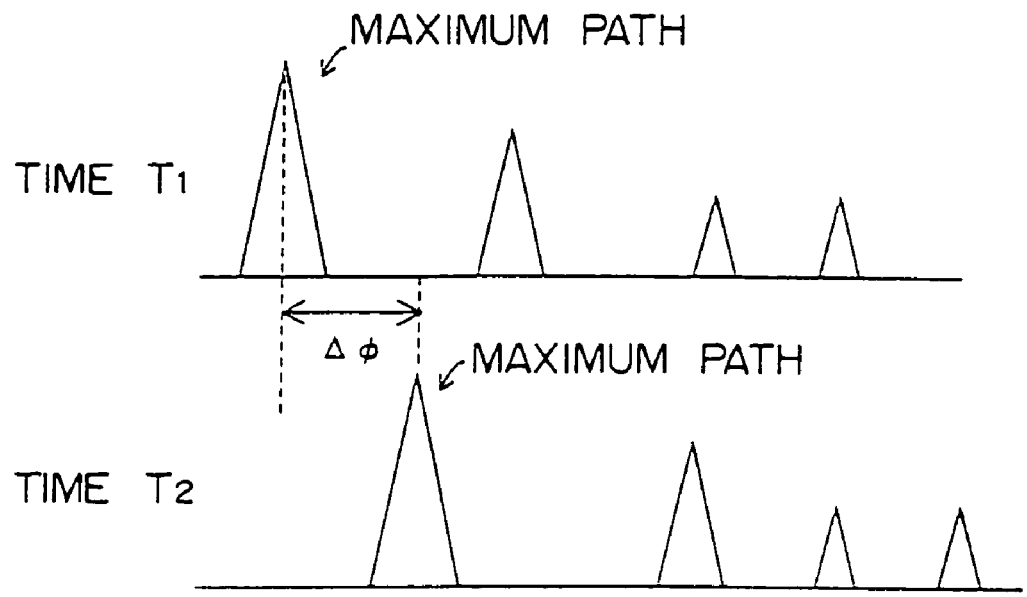
FIGS. 14A and 14B show the state transitions of delay profiles.

When a change of a delay profile is monitored, a method for comparing only a maximum path (the path having the highest correlation level value) shown in FIG. 14A may be used. In the example shown in FIG. 14A, when the amount of a delay $\Delta\phi$ increases, the priority level of the corresponding communications channel is raised. Introduction of this method allows the operations for comparing a delay profile to be simplified, thereby reducing the circuitry size and the comparison time.

Figure 14B:
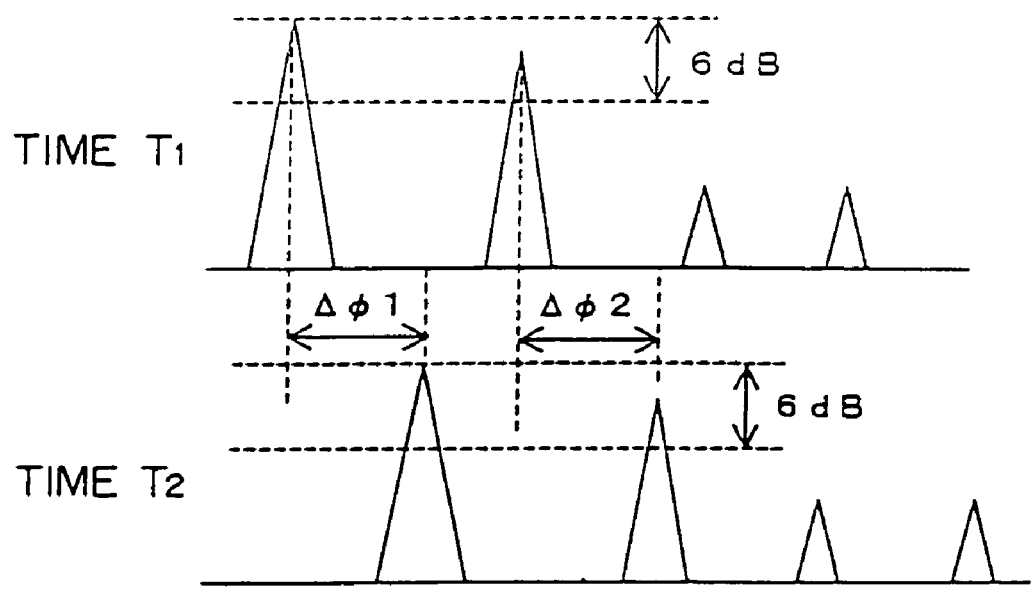

Additionally, the method for utilizing the maximum path or a path in a range of 6 dB from the maximum path, which is shown in FIG. 14B, may be adopted. In the example shown in FIG. 14B, the priority level of the communications channel is raised when the amount of a delay $\Delta\phi1$ or $\Delta\phi2$ becomes larger. Normally, when a plurality of paths are merged with RAKE, etc., the maximum path or the path within the range of 6 dB from the maximum path is referred to as a valid path. With this method, the priority control characteristic can be improved although the circuitry size becomes slightly larger than that implemented with the method shown in FIG. 14A.

(3) Method for Monitoring an Error Rate

An error rate of each communications channel normally varies depending on the state of a transmission line, etc. However, the error rate deteriorates also when the demodulation timing of a CDMA receiving device is not good. Therefore, it is useful to monitor the error rate for each communications channel, and to adjust the demodulation timing of a communications channel from which the deterioration of the error rate is detected.

In this preferred embodiment, the priority level of the communications channel from which a deterioration of the error rate is detected is raised in the priority table. In this way, the demodulation timing of the communications channel from which a deterioration of the error rate is detected, is adjusted with higher priority. Note that the process for detecting the error rate of each communications channel is performed for a transmission power control in an existing CDMA communicating device. The path detector 31 according to this preferred embodiment utilizes the data of the error rate obtained with an existing technique.

The above described preferred embodiment refers to the method for generating a timing signal for one of a plurality of communications channels when pilot signals simultaneously arrive via the plurality of communications channels. If possible, it is desirable to generate timing signals for all of the communications channels. Provided below is the explanation about the method for generating timing signals for a plurality of communications channels when pilot signals simultaneously arrive via the plurality of communications channels.

Figure 15:
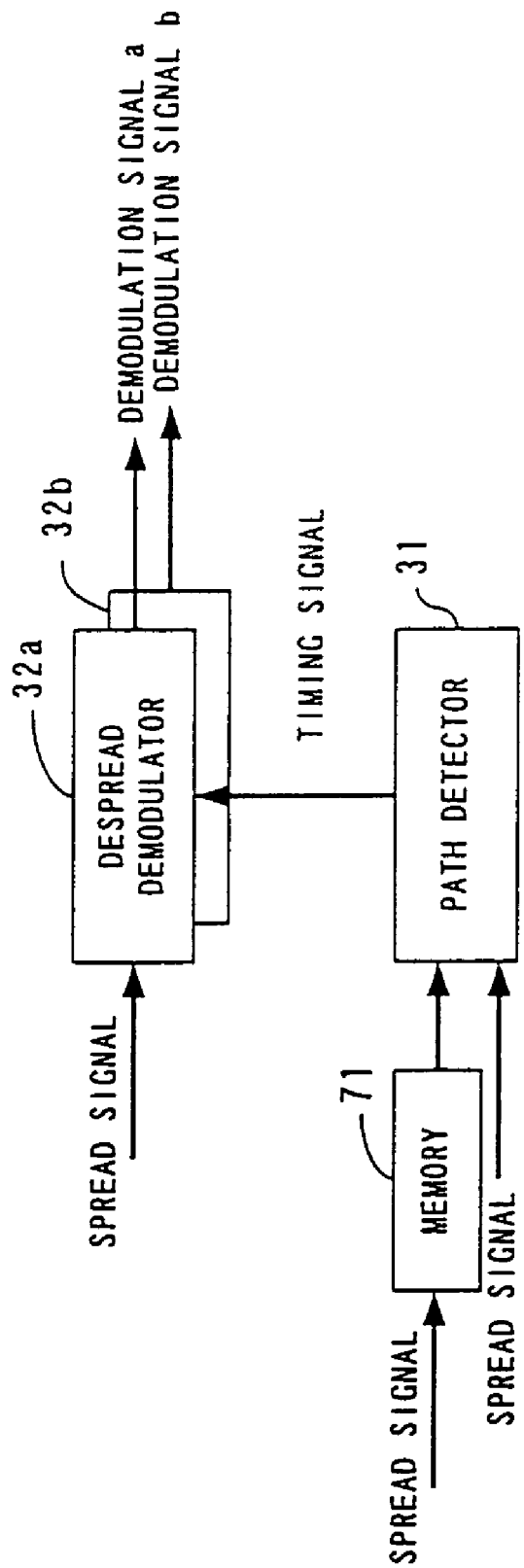
FIG. 15 is a block diagram showing the configuration of a CDMA receiving device in which a memory for storing input signals is arranged at a stage preceding the path detector.

FIG. 15 is a block diagram showing the configuration of a CDMA receiving device in which a memory for storing input signals is arranged at a stage preceding the path detector. A memory 71 is, for example, a semiconductor memory, and is intended to store input signals.

Input signals including spread signals, which are transmitted over the communications channels CH#a and CH#b, are provided to the path detector 31 unchanged, and written to the memory 71. The path detector 31 detects pilot signals of the respective communications channels with an existing technique. If pilot signals are detected from the respective communications channels at different timings, the path detector 31 generates timing signals for the respective communications channels without using the input signal stored in the memory 71, by using the above described method.

However, the timings of the pilot signals of the plurality of communications channels, which are included in the input signals, overlap, the path detector 31 utilizes the input signals stored in the memory 71. Supposing that the timings of the pilot signals of the communications channels CH#a and CH#b overlap, the path detector 31 generates a timing signal for the communications channel CH#a between the times T1 and T2, and then generates a timing signal for the communications channel CH#b between the times T2 and T3. The path detector 31 generates a timing signal by using the input signal provided not via the memory 71 between the times T1 and T2. In this case, the path detector 31 generates correlation level data by spreading the input signal with the spread code #a, and generates a timing signal for the communications channel CH#a based on the correlation level data, with the use of the method explained by referring to FIG. 6. Additionally, the path detector 31 generates a timing signal with the input signal stored in the memory 71 between the times T2 and T3. In this case, the path detector 31 generates correlation level data by spreading the input signal with the spread code #b, and generates a timing signal for the communications channel CH#b based on the correlation level data. As described above, the memory 71 is used to delay input signals.

The CDMA receiving device shown in FIG. 15 has a configuration where all of input signals are stored in the memory 71. However, if the CDMA receiving device has a configuration where a timing signal is generated by using a pilot signal, all of the input signals are not required to generate the timing signal. Namely, a timing signal for each communications channel can be generated if a pilot signal of each communications channel is provided.

Figure 17:
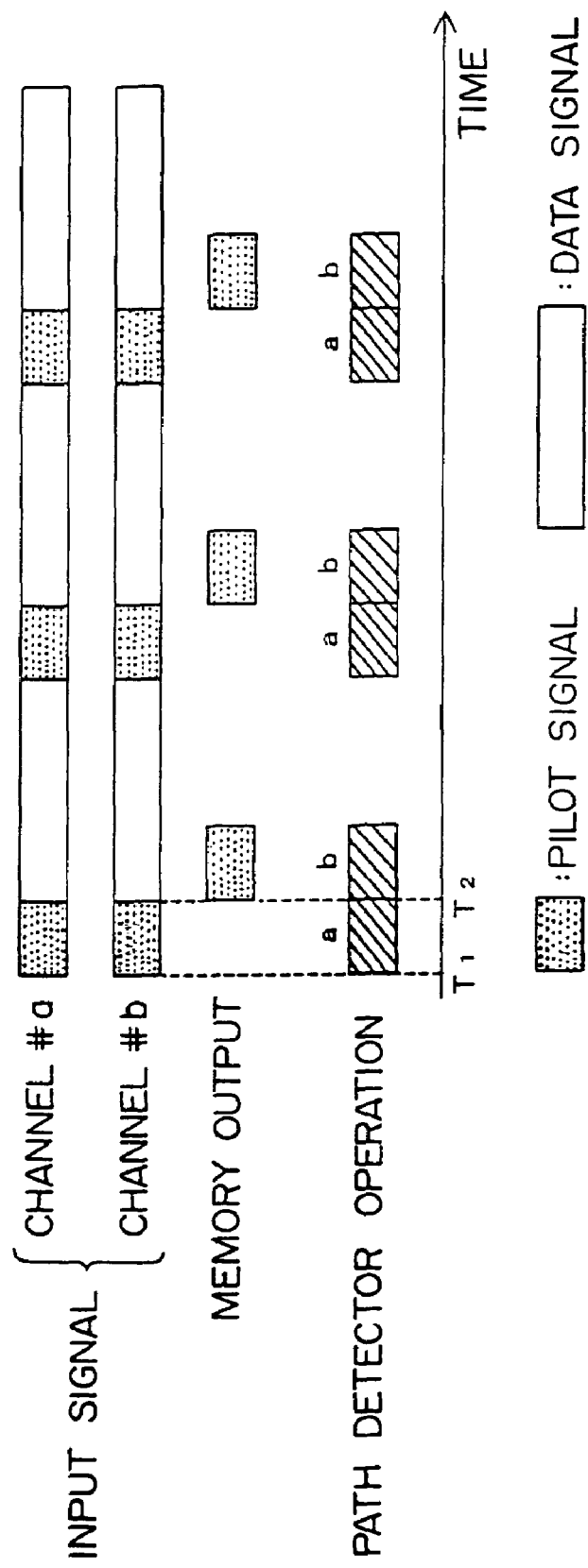
FIG. 17 explains the operations performed when only pilot signals are stored in a memory.

Considering this point, the effect equivalent to that of the configuration shown in FIG. 15 can be obtained even in the configuration where only a pilot signal is written to the memory 71. Assuming that the pilot signals of the communications channels #a and #b simultaneously arrive in a period from the times T1 to T2 as shown in FIG. 17, only the input signals that arrive between the times T1 and T2 are written to the memory 71. The path detector 31 generates a timing signal for the communications channel #a by using the input signal provided not via the memory 71, and then generates the timing signal for the communications channel #b by using the input signal stored in the memory 71. With this configuration, the capacity of the memory 71 can be reduced.

Figure 16:
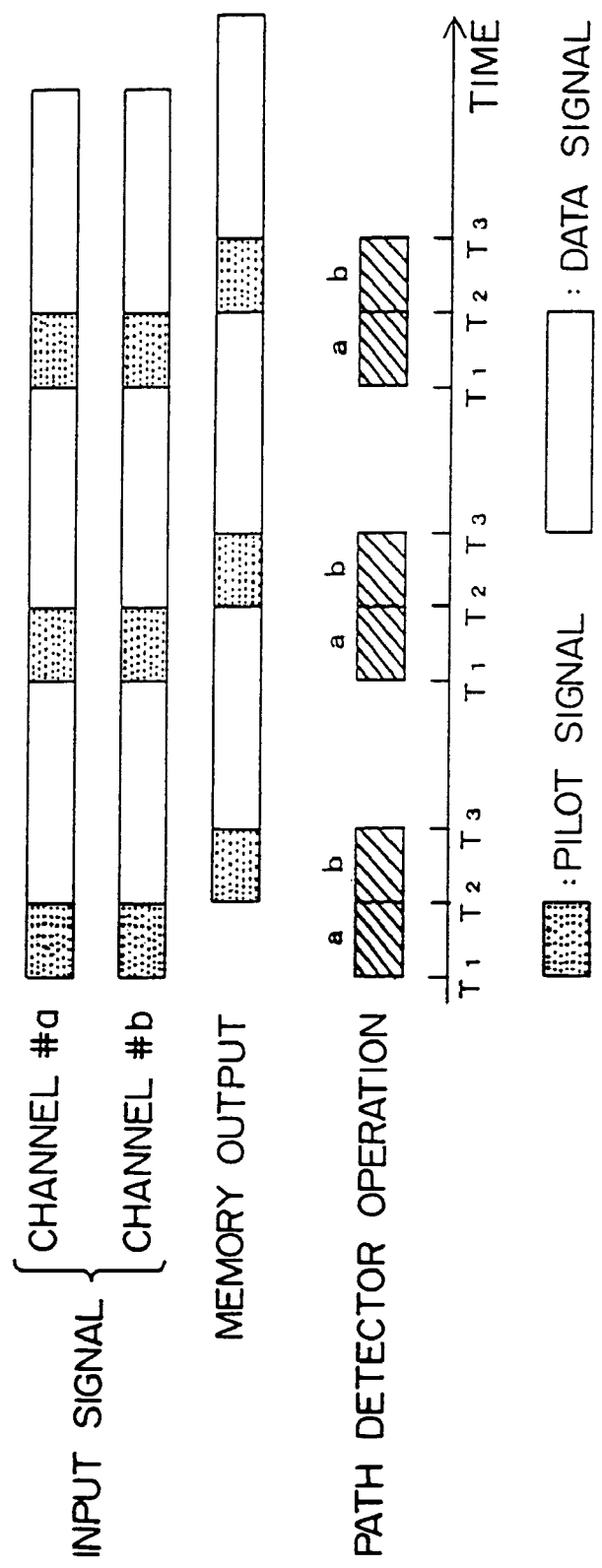
FIG. 16 explains the operations of the path detector within the CDMA receiving device, which is shown in FIG. 15.

The examples shown in FIGS. 15 through 17 assume the case where the pilot signals of two communications channels overlap. This method, however, can be applied to the case where 3 or more pilot signals overlap. For example, if the pilot signals of N communications channels (#a through #n) overlap, the path detector 31 first generates the timing signal for the communications channel #a by using the input signal provided not via the memory 71. Then, the path detector 31 generates a timing signal for the communications channel #b by using the input signal stored in the memory 71. Thereafter, the path detector 31 repeatedly reads the input signals stored in the memory 71 for the communications channels #c through #n, and generates timing signals for the communications channels #c through #n by using the read input signals.

As described above, with the arrangement of a memory for storing input signals at a stage preceding a path detector, the CDMA receiving device shown in FIGS. 15 through 17 can generate respective timing signals for a plurality of communications channels even when pilot signals simultaneously reach via the plurality of communications channels. As a result, the usage efficiency of the path detector 31 increases, and at the same time, the frequency at which a timing signal is provided to each communications channel rises, so that the communication quality of each communications channel can be improved.

By the way, a predetermined amount of time is required to create a delay profile for each communications channel in the path detector 31, and to generate a timing signal for each communications channel based on the delay profile. Accordingly, if the demodulation operation of an input signal is started after a timing signal is generated by the path detector 31, the beginning of the input signal cannot be demodulated in some cases. Next, the method for overcoming this problem will be exemplified.

FIG. 18 is a block diagram showing the configuration of a CDMA receiving device in which a delay unit for storing input signals is arranged at a stage preceding a despread demodulator. A delay unit 72 is implemented, for example, by a semiconductor memory (RAM), and a circuit controlling this memory.

A delay time caused by the delay unit 72 is an amount of time required for generating a timing signal within the path detector 31. This amount of time is determined according to the intervals at which pilot signals are inserted and the number of pilot signals used for generating a timing signal. Furthermore, the delay time caused by the delay unit 72 is obtained as a difference between the timing at which an input signal is written to the delay unit 72 and the timing at which the input signal is read from the delay unit 72.

Figure 19:
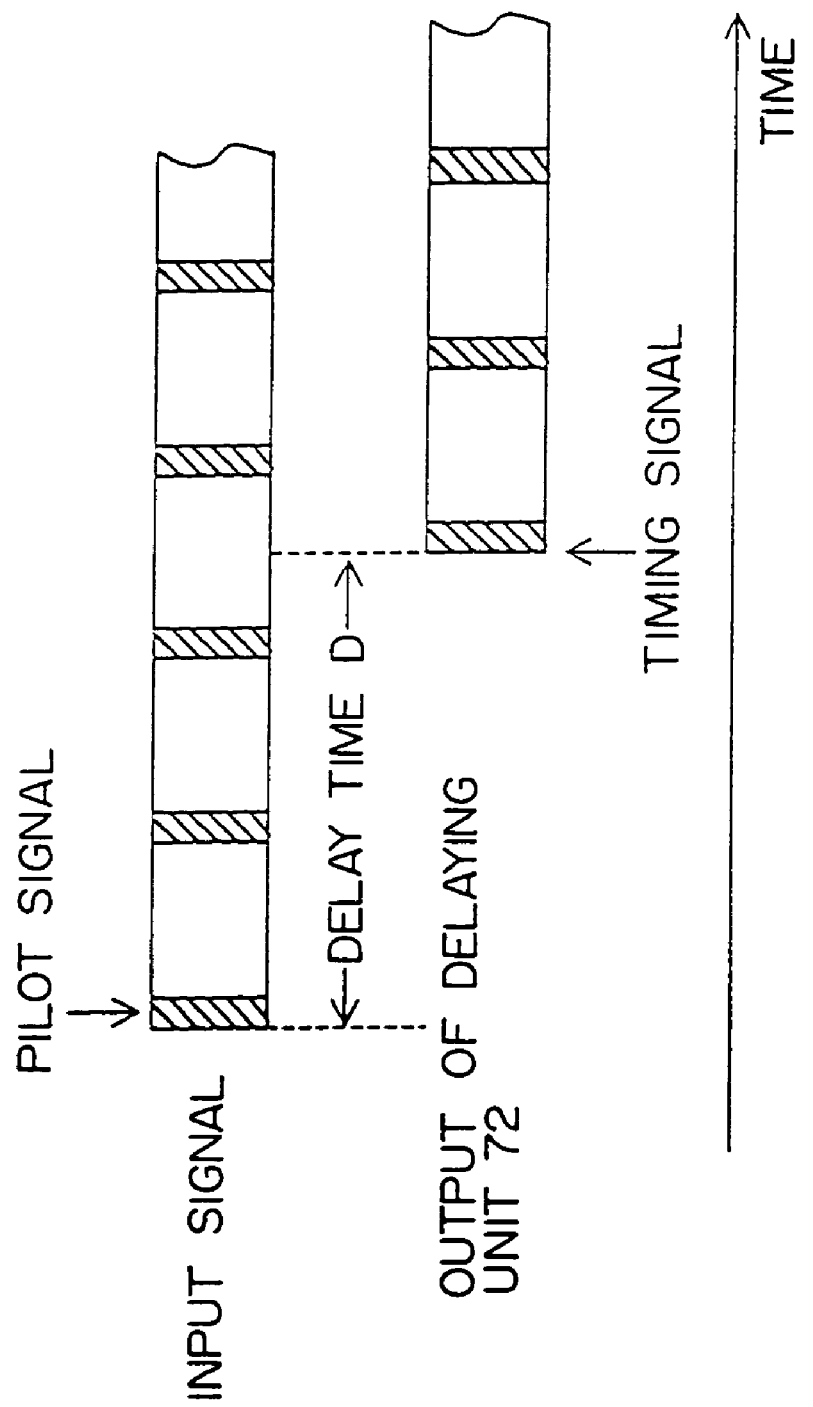
FIG. 19 shows the operations of the CDMA receiving device shown in FIG. 18.

FIG. 19 is a schematic diagram for explaining the operations of the CDMA receiving device shown in FIG. 18. An input signal is provided to the path detector 31. At the same time, the input signal is delayed by the delay unit 72 by a time D and provided also to the despread demodulators 32a and 32b. The path detector 31 generates a timing signal before the delay time D elapses, and provides a corresponding despread demodulator with the generated signal. As a result, the despread demodulator 32a or 32b receives the timing signal for instructing the timing at which the input signal is demodulated prior to the reception of the input signal. Accordingly, the despread demodulators 32a and 32b never fail to demodulate all of input signals.

Figure 20:
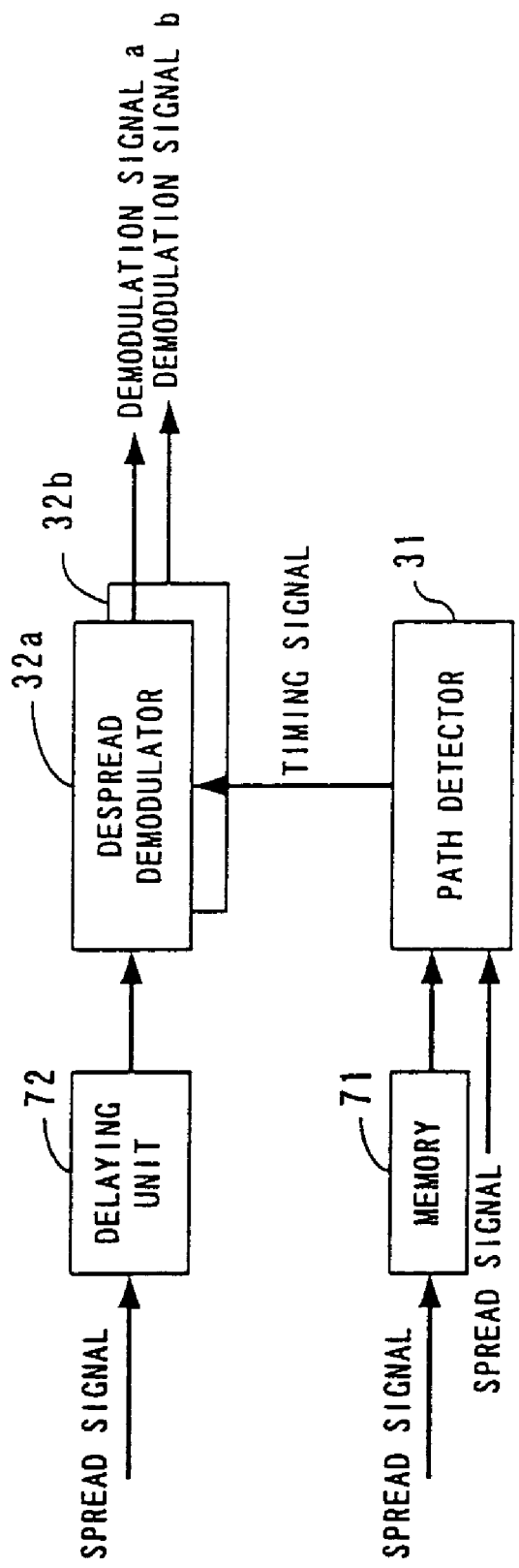
FIG. 20 is a block diagram showing the CDMA receiving device having the capabilities explained by referring to FIGS. 15 through 19.

The above described preferred embodiment refers to the respective capabilities shown in FIGS. 15 through 17 and FIGS. 18 and 19. However, it is possible to implement a CDMA receiving device having both of these capabilities. The block diagram of the CDMA receiving device having both of the capabilities is illustrated in FIG. 20. Introduction of this configuration allows the usage efficiency of the path detector 31 and the quality of each communications channel to be improved, and also allows the beginning of a transmission signal to be demodulated for certain.

By the way, space diversity reception is known as one of the techniques for preventing the influence of fading. With the space diversity reception technique, a fading wave is received by using a plurality of antennas arranged so that reception waves have no correlations, and the waves received by the respective antennas are combined. A wave received by each antenna is sometimes referred to as a diversity branch.

Figure 21:
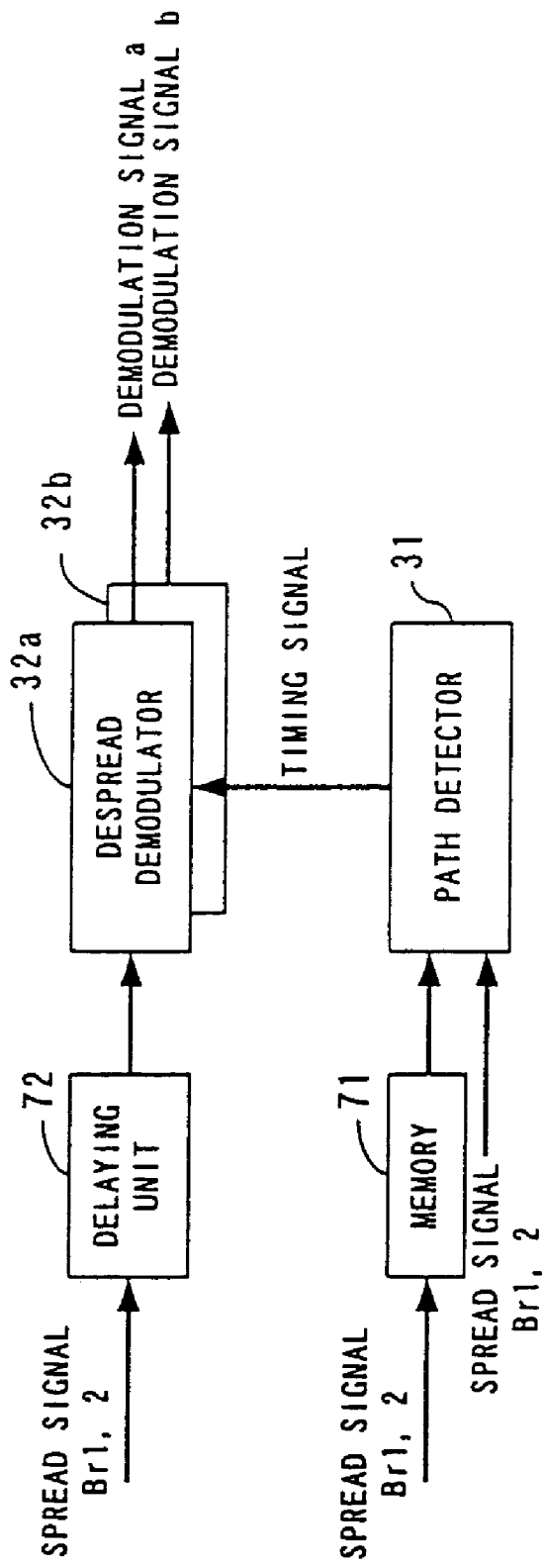
FIG. 21 is a block diagram showing the configuration of the CDMA receiving device having a space diversity receiving capability.

FIG. 21 is a block diagram showing the configuration of a CDMA receiving device having a space diversity reception capability. Here, an explanation is provided by assuming that the space diversity reception capability is implemented by using two antennas. Diversity branches received by these two antennas are referred to as branches 1 and 2 hereinafter.

Figure 22:
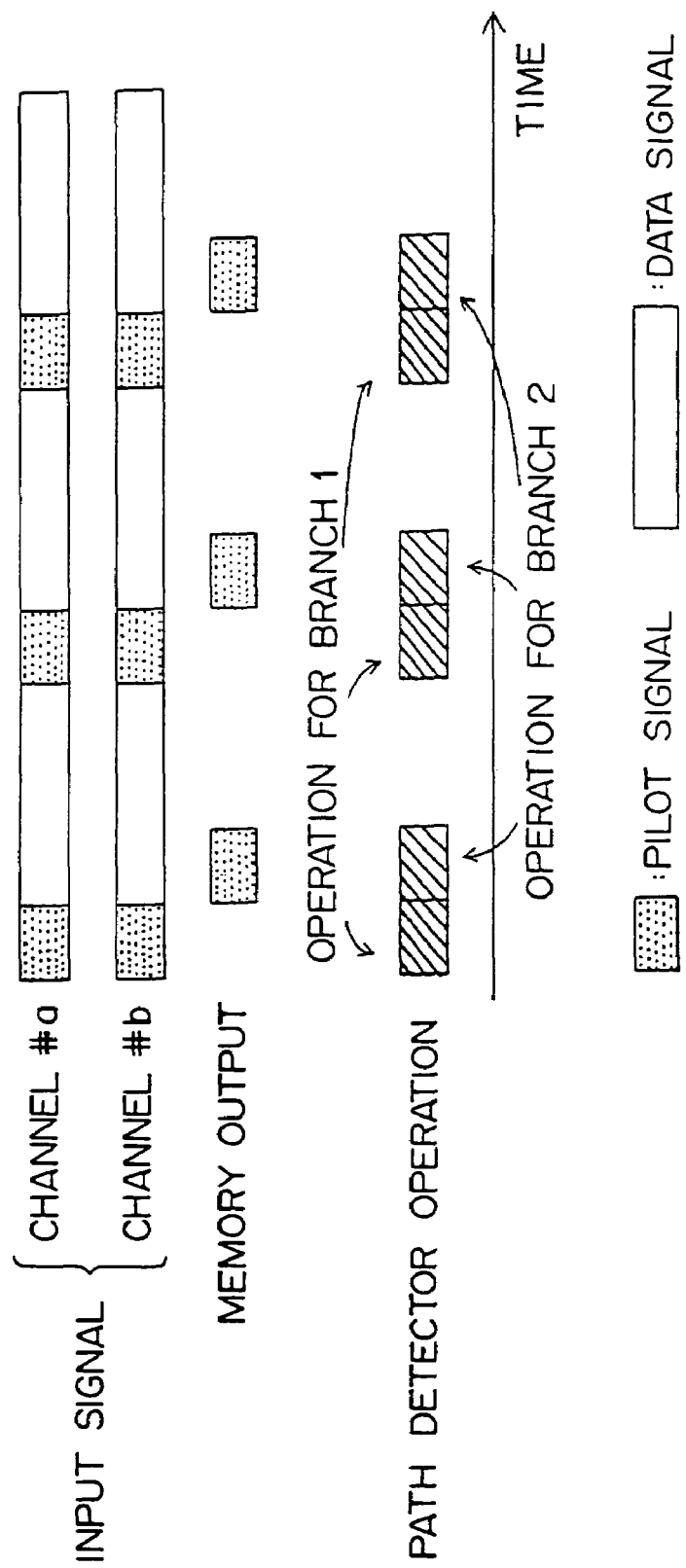
FIG. 22 exemplifies the operations of the CDMA receiving device having the space diversity receiving capability (No. 1)

When the diversity reception capability is introduced, the path detector 31 must generate timing signals for the branches 1 and 2 for the respective communications channels. Additionally, each despread demodulator demodulates a spread signal transmitted over a corresponding communications channel by using the timing signal generated for the branch 1 or 2. Each diversity branch, however, is obtained by receiving the same input signal at different phases. Therefore, the branches 1 and 2 output pilot signals at the same timing as shown in FIG. 22.

According to this preferred embodiment, timing signals for the respective diversity branches can be generated by once storing the signals received from the branches 1 and 2 with the memory 71 arranged at the stage preceding the path detector 31. Namely, the path detector 31 generates a timing signal for the branch 1 by using an input signal provided not via the memory 71, and then generates a timing signal for the branch 2 by using the input signal stored in the memory 71. Notice that these operations are performed for each communications channel.

Figure 23:
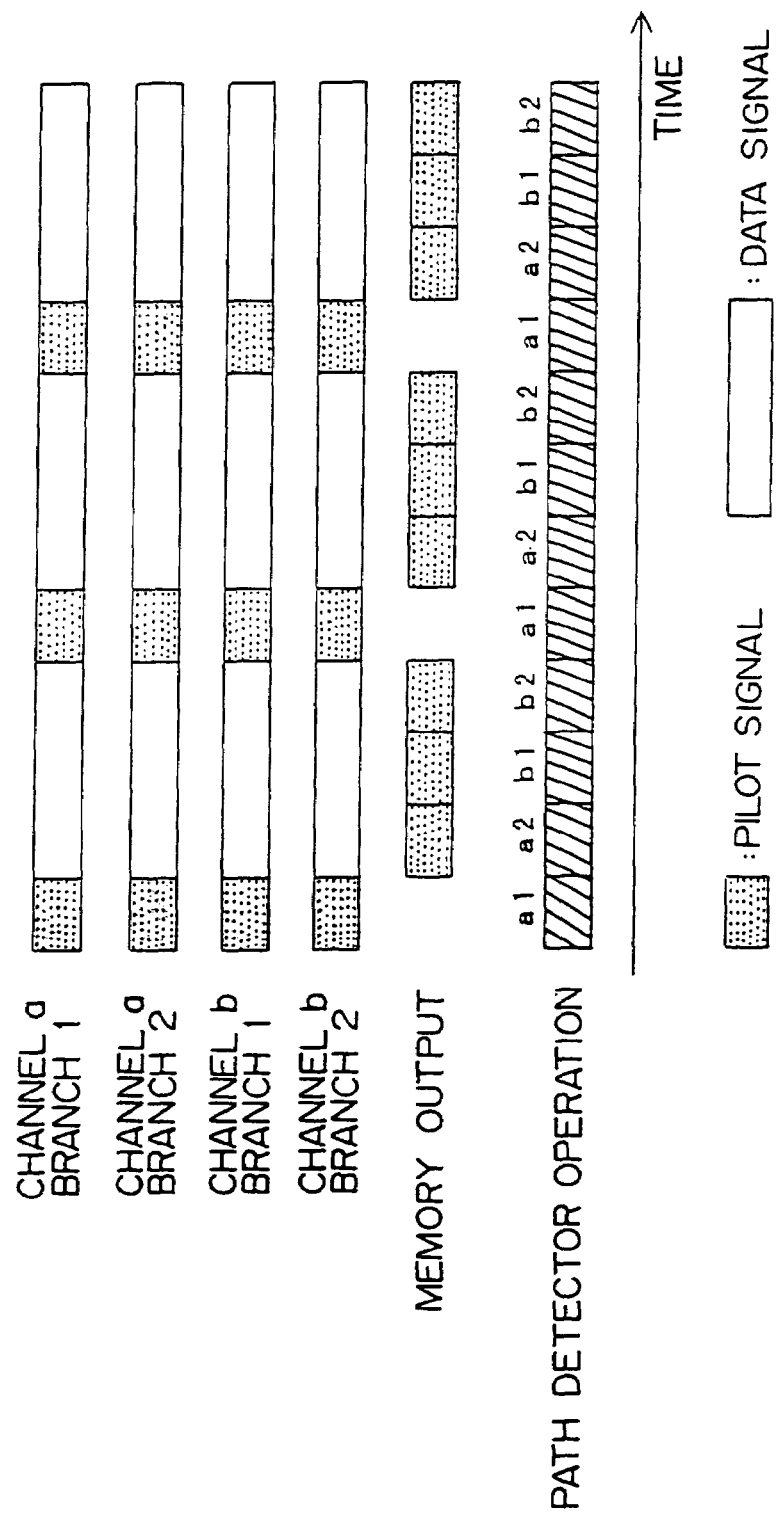
FIG. 23 exemplifies the operations of the CDMA receiving device having the space diversity capability (No. 2).

FIG. 23 exemplifies the operations performed when the arrival timings of pilot signals on two communications channels overlap. In this case, the path detector 31 performs in a time series manner: (1) the operation for generating a timing signal for the branch 1 on the communications channel #a; (2) the operation for generating a timing signal for the branch 2 on the communications channel #a; (3) the operation for generating a timing signal for the branch 1 on the communications channel #b; and (4) the operation for generating a timing signal for the branch 2 on the communications channel #b. The despread demodulator 32a demodulates the spread signals transmitted over the communications channel #a by using the timing signals generated by the above described operations (1) and (2), while the despread demodulator 32b demodulates the spread signals transmitted over the communications channel #b by using the timing signals generated by the above described operations (3) and (4).

According to the above described preferred embodiment, timing signals for demodulating a spread signal are fundamentally generated by using pilot signals inserted in a data signal. However, the present invention is not limited to this configuration. The present invention is also applicable, for example, to the configuration where a timing signal for demodulating a spread signal is generated by using a predetermined portion of a data signal.

Furthermore, the above described preferred embodiment assumes the system where a data signal in which pilot signals are inserted is transmitted. The present invention, however, is not limited to such a system.

According to the present invention, the circuitry for generating a timing signal that is used for demodulating a spread signal is shared by a plurality of despread demodulators, thereby reducing the power consumption and the size of a CDMA receiving device. Additionally, the above described circuitry for generating a timing signal is used in a time-division manner, whereby the degradation of a communications quality can be prevented or minimized.

What is claimed is:

1. A receiving device for receiving spread signals which are respectively transmitted over a plurality of channels, in a CDMA communication, comprising:
   a path detector, which is used in a time-division manner so as to generate timing signals for the plurality of channels, for generating a timing signal, in each time interval, corresponding to each of the plurality of channels according to a correlation between received spread signals, which are spread with different spread codes, and a spread code corresponding to each of the plurality of channels; and
   a plurality of despread demodulators, which are arranged for the plurality of channels, for respectively demodulating a spread signal among the received spread signals according to the corresponding timing signal generated by said path detector.

2. The receiving device according to claim 1, wherein said path detector further comprising:
   spread code generating means for generating spread codes corresponding to the plurality of channels in an order according to a predetermined algorithm;
   a matched filter for outputting correlation level data between the received spread signals and the spread code generated by said spread code generating means; and
   timing signal generating means for generating a timing signal based on the correlation level data.

3. The receiving device according to claim 1, wherein:
   a spread signal transmitted over each of the plurality of channels includes pilot signals inserted at predetermined intervals; and
   said path detector generates the timing signal by using the pilot signals for each of the plurality of channels.

4. The receiving device according to claim 3, further comprising:
   a memory for storing at least a portion of the received spread signals including a pilot signal within an input spread signal; and
   memory controlling means for repeatedly reading the pilot signal from said memory an L−1 number of times and for providing said path detector with read pilot signals, when L branch space diversity reception is made, wherein
   said path detector sequentially generates timing signals by using the respective pilot signals.

5. The receiving device according to claim 1, further comprising:
   delaying means for delaying a signal to be input to the plurality of despread demodulators by an amount of time required to generate the timing signal by said path detector.

6. A receiving device for receiving spread signals which are respectively transmitted over a plurality of channels in a CDMA communication, which generates a timing signal by using a plurality of pilot signals for each of the plurality of channels, comprising:
   a path detector, which is used in a time-division manner so as to generate timing signals for the plurality of channels, for generating a timing signal corresponding to each of the plurality of channels according to a correlation between received spread signals and a spread code corresponding to each of the plurality of channels; and
   a plurality of despread demodulators, which are arranged for the plurality of channels, for respectively demodulating a spread signal among the received spread signals according to the corresponding timing signal generated by said path detector,
   said path detector further comprising:
   first path detecting means for detecting a path with a voltage addition operation if a correlation level between pilot signals is high;
   second path detecting means for detecting a path with a power addition operation if the correlation between pilot signals is low; and
   timing signal generating means for generating the timing signal based on the paths detected by said first and second path detecting means.

7. A receiving device for receiving spread signals which are respectively transmitted over a plurality of channels in a CDMA communication, which generates a timing signal by using a plurality of pilot signals for each of the plurality of channels, comprising:
   a path detector, which is used in a time-division manner so as to generate timing signals for the plurality of channels, for generating a timing signal corresponding to each of the plurality of channels according to a correlation between received spread signals and a spread code corresponding to each of the plurality of channels; and
   a plurality of despread demodulators, which are arranged for the plurality of channels, for respectively demodulating a spread signal among the received spread signals according to the corresponding timing signal generated by said path detector,
   said path detector further comprising:
   path detecting means for detecting a path with an operation for adding an absolute value of correlation level data of each of the plurality of pilot signals; and
   timing signal generating means for generating the timing signal based on the path detected by said path detecting means.

8. A receiving device for receiving spread signals which are respectively transmitted over a plurality of channels in a CDMA communication, comprising:
   a path detector, which is used in a time-division manner so as to generate timing signals for the plurality of channels, for generating a timing signal corresponding to each of the plurality of channels according to a correlation between received spread signals and a spread code corresponding to each of the plurality of channels;
   a plurality of despread demodulators, which are arranged for the plurality of channels, for respectively demodulating a spread signal among the received spread signals according to the corresponding timing signal generated by said path detector; and
   priority information storing means for storing information about priorities of the plurality of despread demodulators, wherein
   said path detector operates for a despread demodulator determined based on the priority information stored in said priority information storing means.

9. The receiving device according to claim 8, wherein when a synchronization establishment process is requested for a certain channel, a higher priority is given to a despread demodulator corresponding to the channel.

10. The receiving device according to claim 8, further comprising:
profile detecting means for detecting a delay profile of each of the channels; and
priority determining means for determining the priorities of the plurality of despread demodulators based on an amount of a change of the delay profile, which is detected for each of the channels.

11. The receiving device according to claim 10, wherein said priority determining means determines the priorities of the plurality of despread demodulators based on a change of a maximum path on each of the channels.

12. The receiving device according to claim 10, wherein said priority determining means determines the priorities of the plurality of despread demodulators based on changes of a maximum path on each of the channels and of a path existing in a predetermined range from the maximum path.

13. The receiving device according to claim 8, wherein said path detector determines the priorities of the plurality of despread demodulators based on an error rate of each of the channels.

14. The receiving device according to claim 8, wherein said path detector references said priority information storing means only when timings of the pilot signals on the plurality of channels overlap.

15. A receiving device for receiving spread signals which are respectively transmitted over a plurality of channels in a CDMA communication, comprising:
a path detector, which is used in a time-division manner so as to generate timing signals for the plurality of channels, for generating a timing signal corresponding to each of the plurality of channels according to a correlation between received spread signals and a spread code corresponding to each of the plurality of channels;
a plurality of despread demodulators, which are arranged for the plurality of channels, for respectively demodulating a spread signal among the received spread signals according to the corresponding timing signal generated by said path detector;
a memory for storing input spread signals; and
memory controlling means for reading the input spread signals from said memory and for providing said path detector with the read signals, when the timing of pilot signals on the plurality of channels overlap, wherein
a spread signal transmitted over each of the plurality of channels includes the pilot signals inserted at predetermined intervals,
said path detector generates the timing signal by using the pilot signals for each of the plurality of channels, and said path detector sequentially generates timing signals corresponding to the channels by using the pilot signals on the plurality of channels.

16. The receiving device according to claim 15, wherein said memory controlling means repeatedly reads the input spread signals from said memory a required number of times, according to the number of overlapping pilot signals.

17. The receiving device according to claim 15, wherein when the timings of the pilot signals on the plurality of channels overlap, only portions including the pilot signals within the input signals are stored in said memory.

18. A receiving device for receiving spread signals which are respectively transmitted over a plurality of channels in a CDMA communication, comprising:
a path detector, which operates in a time-division manner, for detecting delay profiles for the plurality of channels being separated with a respective spread code and for generating a timing signal corresponding to each of the channels based on the delay profiles; and
a plurality of despread demodulators, which are arranged for the plurality of channels, for respectively demodulating a spread signal among the received of spread signals according to the corresponding timing signal generated by said path detector.

19. A receiving device for receiving spread signals which are respectively transmitted over a plurality of channels in a CDMA communication, comprising:
a plurality of despread demodulators, which are respectively arranged for the plurality of channels, for demodulating a spread signal transmitted over a corresponding channel by despreading the spread signal with a corresponding spread code; and
instructing means for instructing a despreading timing of the corresponding spread code used for despreading each of the spread signals transmitted over the plurality of channels,
said instructing means is shared by the plurality of despread demodulators.

20. A receiving device for receiving spread signals which are respectively transmitted over a plurality of channels in a CDMA communication, comprising:
a path detector being used in a time-division manner so as to generate timing signals for the plurality of channels according to correlations between received spread signals, which are spread with different spread codes, and spread codes; and
a plurality of despread demodulators demodulating the plurality of channels, each despread demodulator demodulating each received spread signal according to a corresponding timing signal among said timing signals generated by said path detector.

* * * * *